United States Patent
Howard

(10) Patent No.: US 8,762,946 B2
(45) Date of Patent: Jun. 24, 2014

(54) METHOD FOR AUTOMATIC EXTRACTION OF DESIGNS FROM STANDARD SOURCE CODE

(75) Inventor: Kevin D. Howard, Tempe, AZ (US)

(73) Assignee: Massively Parallel Technologies, Inc., Boulder, CO (US)

( * ) Notice: Subject to any disclaimer, the term of this patent is extended or adjusted under 35 U.S.C. 154(b) by 13 days.

(21) Appl. No.: 13/490,345

(22) Filed: Jun. 6, 2012

(65) Prior Publication Data

US 2013/0254743 A1 Sep. 26, 2013

Related U.S. Application Data

(63) Continuation-in-part of application No. 13/425,136, filed on Mar. 20, 2012.

(51) Int. Cl.
*G06F 9/44* (2006.01)

(52) U.S. Cl.
USPC ........... 717/123; 717/104; 717/106; 717/120; 705/35; 705/321

(58) Field of Classification Search
None
See application file for complete search history.

(56) References Cited

U.S. PATENT DOCUMENTS

| | | | |
|---|---|---|---|
| 5,430,873 A | 7/1995 | Abe et al. | |
| 7,162,710 B1 * | 1/2007 | Edwards et al. | 717/111 |
| 2003/0079188 A1 | 4/2003 | McConaghy et al. | |
| 2003/0140332 A1 | 7/2003 | Norton et al. | |
| 2001/0149968 | 8/2003 | Imai | |
| 2004/0015775 A1 | 1/2004 | Simske et al. | |
| 2006/0020949 A1 | 1/2006 | Hoshino et al. | |
| 2006/0136850 A1 | 6/2006 | Corbell, Jr. et al. | |
| 2007/0294578 A1 * | 12/2007 | Qiao et al. | 714/17 |
| 2008/0263506 A1 | 10/2008 | Broadfoot et al. | |
| 2008/0307267 A1 | 12/2008 | Chandrasekaran | |
| 2009/0119484 A1 | 5/2009 | Mohl et al. | |
| 2009/0241106 A1 * | 9/2009 | Andersen | 717/175 |
| 2009/0265696 A1 * | 10/2009 | Grice | 717/156 |
| 2010/0153908 A1 * | 6/2010 | Sarkar et al. | 717/104 |
| 2011/0283095 A1 * | 11/2011 | Hall et al. | 712/228 |
| 2012/0066664 A1 * | 3/2012 | Howard | 717/106 |
| 2012/0101929 A1 * | 4/2012 | Howard | 705/35 |

FOREIGN PATENT DOCUMENTS

| | | | |
|---|---|---|---|
| JP | 2010097426 A | 4/2010 | |
| WO | 2007104158 A1 | 9/2007 | |

OTHER PUBLICATIONS

PCT Patent Application PCT/US2013/033125 International Search Report and Written Opinion dated Jun. 27, 2013, 9 pages.
PCT Patent Application PCT/US2013/044573 International Search Report and Written Opinion dated Jul. 22, 2013, 8 pages.
PCT Patent Application PCT/US2013/044818 International Search Report and Written Opinion dated Sep. 13, 2013, 9 pages.

* cited by examiner

*Primary Examiner* — Don Wong
*Assistant Examiner* — Roberto E Luna
(74) *Attorney, Agent, or Firm* — Lathrop & Gage LLP

(57) ABSTRACT

A system and method for automatic code-design and file/database-design association. Existing source code is analyzed for process and control elements. The control elements are encapsulated as augmented state machines and the process elements are encapsulated as kernels. The new elements can then have meta-data attached (including, a name, I/O method, and test procedures), allowing software code sharing and automatic code/file/database upgrading, as well as allowing sub-subroutine level code blocks to be accessed directly.

2 Claims, 17 Drawing Sheets

METHOD FOR AUTOMATIC EXTRACTION OF DESIGNS FROM STANDARD SOURCE CODE

RELATED APPLICATIONS

This application is a continuation-in-part of U.S. patent application Ser. No. 13/425,136 entitled "Parallelism From Functional Decomposition", filed Mar. 12, 2012, which is incorporated herein by reference.

BACKGROUND

Software code sharing is important, as the current state-of-the-art allows for the sharing of subroutines (sometimes called methods) and libraries of subroutines. The term "subroutine" in computer-science typically refers to a named block of code which may have a parameter list and which may have a return value. This block of code can be accessed from within another code block via the use of its name and parameter list. There can be significant amounts of code within the subroutine. Sharing portions of a subroutine is not possible unless the to-be-shared code portion is itself a subroutine. Rather than requiring the entire subroutine be shared, it is more efficient to share only that portion of the subroutine that is required to be shared.

Furthermore, in prior art software development environments, code and software design quickly become disassociated, thus making difficult the task of maintaining code/design and file/database/design association.

SUMMARY

The introduction of any new technology requires a bridging mechanism between past solutions and new capability. The present method forms a bridge between conventional programming and an advanced programming method by analyzing existing source code for process and control elements, then encapsulating the control elements as augmented state machines and process elements as kernels. The new elements can then have meta-data attached, allowing software code sharing at the sub-subroutine level and automatic code/file/database upgrading, thus transforming the older technology into advanced technology.

Automatic code-design and file/database-design association allows a developer to simply perform the design, while locating and associating code or files/databases become automatic. Contrast this with source-code sharing models that require the developer to first find, then analyze, and finally associate blocks of code or locate and verify files and databases. Once code/files/databases and design can be reliably associated, then new, better code/files/databases can also be automatically located and used to replace existing code blocks, effectively allowing automatic code/file/database upgrading.

DETAILED DESCRIPTION

Definitions

Figure 1:
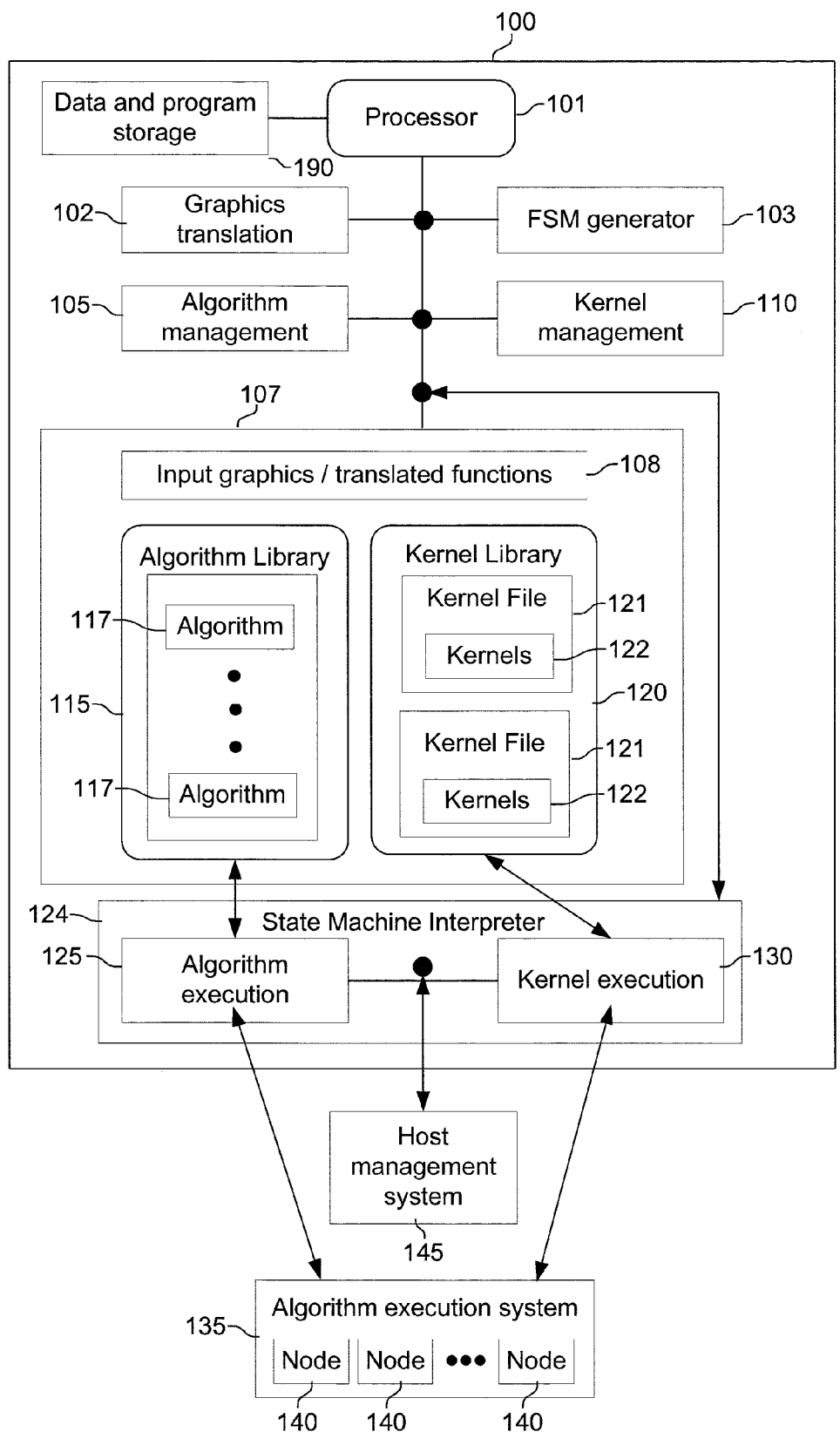
FIG. 1 is a system diagram showing an exemplary environment in which the present method operates.

The following terms and concepts used herein are defined below.

Data transformation—A data transformation is a task that accepts data as input and transforms the data to generate output data.

Control transformation—A control transformation evaluates conditions and sends and receives control to/from other control transformations and/or data transformations.

Control bubble—A control bubble is a graphical indicator of a control transformation. A control bubble symbol indicates a structure that performs only transitions and does not perform processing.

Process bubble—A process bubble is a graphical indicator of a data transformation.

Control Kernel—A control kernel is a software routine or function that contains only the following types of computer language constructs: declaration statements, subroutine calls, looping statements (for, while, do, etc), decision statements (if-else, etc.), arithmetic statements (including increment and decrement operators), relational operators, logical operators, type declarations and branching statements (goto, jump, continue, exit, etc.).

Process Kernel—A process kernel is a software routine or function that contains the following types of computer language constructs: assignment statements, looping statements, arithmetic operators (including increment and decrement operators), and type declaration statements Information is passed to and from a process kernel via global memory using RAM.

Function—a software routine, or more simply an algorithm that performs one or more transformations.

Node—A node is a processing element comprised of a processing core, or processor, memory and communication capability.

Metadata—Metadata is information about an entity, rather than the entity itself.

MPT Algorithm—An MPT algorithm comprises control kernels, process kernels, and MPT algorithms.

MPT Data Transfer Model—The MPT data transfer model comprises a standard model for transferring information to/from a process kernel. The model includes a key, a starting address, a size, and a structure_index. The key is the current job number, the starting address is the information starting address, the size is the number of bytes the data construct uses, and the structure_index points to the struct definition that is used by the process kernel to interpret the memory locations accessed.

MPT State Machine—An MPT state machine is a two-dimensional matrix which links together all relevant control kernels into a single non-language construct that calls process kernels. Each row in a MPT state machine consists of an index, the subroutine to be called (or the symbol "NOP"), a conditional statement, an index to the next accessible row (when the condition is true, or an end-of-job symbol is encountered), and an index to the next accessible row (when the condition is false, or when an end-of-job symbol is encountered). Process kernels form the "states" of the state-machine while the activation of those states form the state transition. This eliminates the need for software linker-loaders.

State Machine Interpreter—for the purpose of the present document, a State Machine Interpreter is a method whereby the states and state transitions of a state machine are used as active software, rather than as documentation.

Computing Environment

FIG. 1 is an exemplary diagram of the computing environment in which the present system and method operates. As shown in FIG. 1, system 100 includes a processor 101 which executes tasks and programs including a kernel management module 110, an algorithm management module 105, state machine 124, a kernel execution module 130, and an algorithm execution module 125. System 100 further includes storage 107, in which is stored data including libraries 115/120 which respectively store algorithms 117 and kernels 122. Storage 107 may be RAM, or a combination of RAM and other storage such as a disk drive. Module 102 performs a translation of a graphical input functional decomposition diagram to corresponding functions (ultimately, states in a state machine), and stores the translated functions in appropriate libraries in storage area 108. Module 103 generates appropriate finite state machines from the translated functions.

System 100 is coupled to a host management system 145, which provides management of system functions, and issues system requests. Algorithm execution module 125 initiates execution of kernels invoked by algorithms that are executed. Algorithm execution system 135 may comprise any computing system with multiple computing nodes 140 which can execute kernels stored in system 100. Management system 145 can be any external client computer system which requests services from the present system 100. These services include requesting that kernels or algorithms be added/changed/deleted from a respective library within the current system.

The software for system services that are indicated below as being initiated by various corresponding 'buttons' is stored in data and program storage area 190.

In addition, management system 145 can request that a kernel/algorithm be executed. It should be noted that the present system is not limited to the specific file names, formats and instructions presented herein. The methods described herein may be executed via system 100, or other systems compatible therewith.

Software Functional Structure

Figure 2:
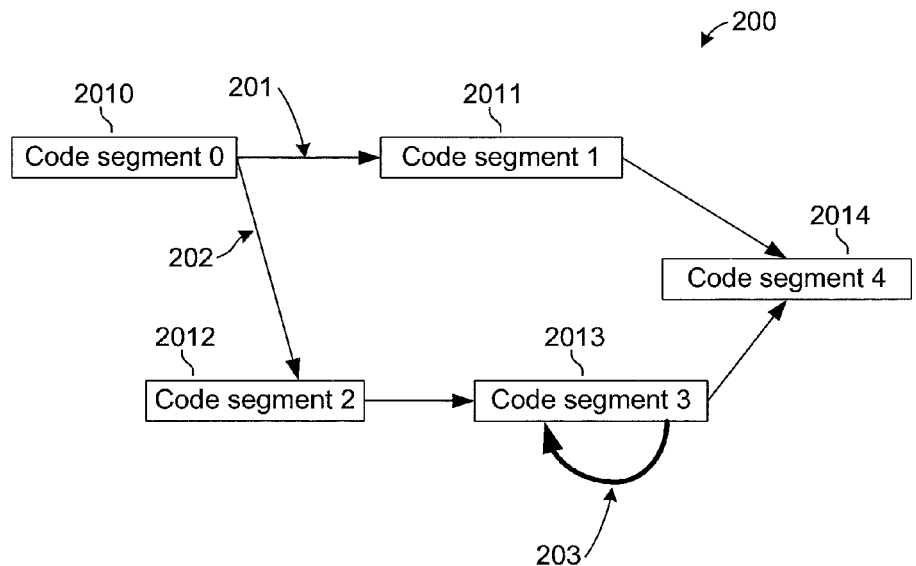
FIG. 2 is an exemplary diagram showing branching structures binding code segments in a function.

Standard software is constructed using functions (sometimes also called methods, routines, or algorithms) and code segments to instantiate application concepts. A code segment is comprised of one or more code statements. Functions typically contain code segments bound together with branching or looping structures, as illustrated in the exemplary diagram of FIG. 2. As shown in FIG. 2, code segment 0 (ref. no. 2010) has two branches, 201 and 202, which respectively branch to code segments 201 (2010) and 202 (2012). Code segment 3 (2013) includes a loop 203. In the FIG. 2 example, code segment 1 and code segment 2 both transfer execution to linear code segment 4 (2014).

Table 1, below, shows the branching and looping commands used by the C language, for example.

TABLE 1

| Type of C-Language Statement | C-Language Statement |
| --- | --- |
| Branch | Goto |
| Branch | If-else |
| Branch | Else-If |
| Branch | Switch |
| Branch | Case |
| Branch | Default |
| Branch | Break |
| Branch | Continue |
| Branch | Return |
| Branch | Subroutine call |
| Branch | Method call |
| Branch | ?: |
| Loop | For |
| Loop | While |
| Loop | Do . . . while |

There are two additional types of statements in the C language: storage declaration and operator, as respectively shown in Table 2 and Table 3, below. Note that although C language code is shown in all examples, any programming language can be analyzed similarly.

TABLE 2

| Declaration Type Name | Number of Bytes |
| --- | --- |
| #define | 0 |
| #include | 0 |
| Char | 1 |
| Auto Char | 1 |
| Static Char | 1 |
| Extern Char | 1 |
| Register Char | 1 |
| Unsigned Char | 1 |
| Auto Unsigned Char | 1 |
| Static Unsigned Char | 1 |
| Extern Unsigned Char | 1 |
| Register Unsigned Char | 1 |

TABLE 2-continued

| Declaration Type Name | Number of Bytes |
| --- | --- |
| Int | 4 |
| Auto Int | 4 |
| Static Int | 4 |
| Extern Int | 4 |
| Register Int | 4 |
| Unsigned Int | 4 |
| Auto Unsigned Int | 4 |
| Static Unsigned Int | 4 |
| Extern Unsigned Int | 4 |
| Register Unsigned Int | 4 |
| Short | 2 |
| Auto Short | 2 |
| Static Short | 2 |
| Extern Short | 2 |
| Register Short | 2 |
| Short Int | 2 |
| Auto Short Int(eger) | 2 |
| Static Short Int(eger) | 2 |
| Extern Short Int(eger) | 2 |
| Register Short Int(eger) | 2 |
| Unsigned Short Int(eger) | 2 |
| Auto Unsigned Short Int(eger) | 2 |
| Static Unsigned Short Int(eger) | 2 |
| Extern Unsigned Short Int(eger) | 2 |
| Register Unsigned Short Int(eger) | 2 |
| Long | 8 |
| Auto Long | 8 |
| Static Long | 8 |
| Extern Long | 8 |
| Register Long | 8 |
| Long Int(eger) | 8 |
| Auto Long Int(eger) | 8 |
| Static Long Int(eger) | 8 |
| Extern Long Int(eger) | 8 |
| Register Long Int(eger) | 8 |
| Unsigned Long Int(eger) | 8 |
| Auto Unsigned Long Int(eger) | 8 |
| Static Unsigned Long Int(eger) | 8 |
| Extern Unsigned Long Int(eger) | 8 |
| Register Unsigned Long Int(eger) | 8 |
| Float | 4 |
| Auto Float | 4 |
| Static Float | 4 |
| Extern Float | 4 |
| Register Float | 4 |
| Unsigned Float | 4 |
| Auto Unsigned Float | 4 |
| Static Unsigned Float | 4 |
| Extern Unsigned Float | 4 |
| Register Unsigned Float | 4 |
| Double | 8 |
| Auto Double | 8 |
| Static Double | 8 |
| Extern Double | 8 |
| Register Double | 8 |
| Unsigned Double | 8 |
| Auto Unsigned Double | 8 |
| Static Unsigned Double | 8 |
| Extern Unsigned Double | 8 |
| Register Unsigned Double | 8 |

TABLE 3

| Operator types | C-Language Assignment Operators |
| --- | --- |
| Unary Operator | * |
| Unary Operator | & |
| Unary Operator | - |
| Unary Operator | ! |
| Unary Operator | ++ lvalue |
| Unary Operator | -- lvalue |
| Unary Operator | Lvalue ++ |
| Unary Operator | Lvalue -- |
| Unary Operator | Return |

TABLE 3-continued

| Operator types | C-Language Assignment Operators |
| --- | --- |
| Unary Operator | (type-name) expression |
| Unary Operator | Sizeof expression |
| Unary Operator | Sizeof (type-name) |
| Multiplicative Operator | Expression * expression |
| Multiplicative Operator | Expression / expression |
| Multiplicative Operator | Expression % expression |
| Additive Operator | Expression + expression |
| Additive Operator | Expression − expression |
| Shift Operator | Expression << expression |
| Shift Operator | Expression >> expression |
| Rational Operator | Expression < expression |
| Rational Operator | Expression > expression |
| Rational Operator | Expression <= expression |
| Rational Operator | Expression >= expression |
| Equality Operator | Expression == expression |
| Equality Operator | Expression != expression |
| Bitwise Operator | Expression & expression |
| Bitwise Operator | Expression ^ expression |
| Bitwise Operator | Expression \| expression |
| Bitwise Operator | Expression && expression |
| Bitwise Operator | Expression \|\| expression |
| Assignment Operator | Lvalue = expression |
| Assignment Operator | Lvalue += expression |
| Assignment Operator | Lvalue −= expression |
| Assignment Operator | Lvalue *= expression |
| Assignment Operator | Lvalue /= expression |
| Assignment Operator | Lvalue %= expression |
| Assignment Operator | Lvalue >>= expression |
| Assignment Operator | Lvalue <<= expression |
| Assignment Operator | Lvalue &= expression |
| Assignment Operator | Lvalue ^= expression |
| Assignment Operator | Lvalue\| = expression |

Figure 3:
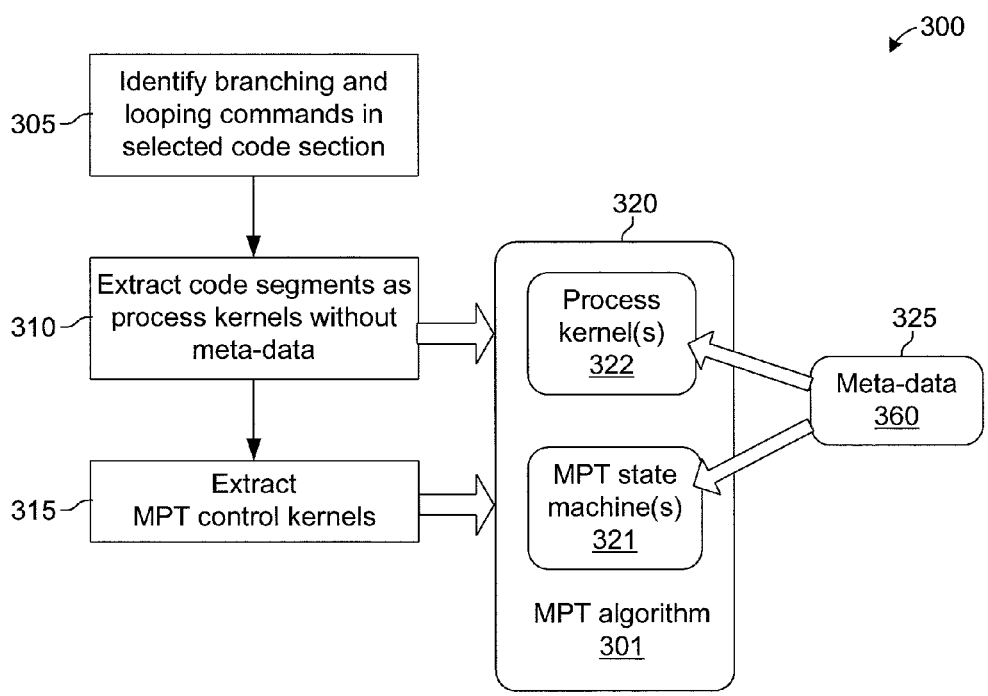
FIG. 3 is a flowchart of a high-level exemplary algorithm for automatically extracting designs from standard source code.

FIG. 3 is a high-level exemplary algorithm 300 showing the present method for automatically extracting designs from standard source code. As shown in FIG. 3, at step 305, the branching and looping commands are identified in a code section 200 of interest. With the branching and looping commands identified, the code segments are extracted as process kernels 322 without meta-data, at step 310. Control kernels 331 are then extracted at step 315. At step 320, the control kernels 331 are then encapsulated as MPT state machines 321 and the process kernels are encapsulated as process kernels 322. The extracted information is treated as an 'MPT algorithm' 301.

At step 325, meta-data 360 is then associated with these newly-created control and process design elements. The meta-data can be used to associate the newly extracted design elements with code other than the original code used in the extraction process, as described further below.

Example Source Code for MPT Algorithm

Figure 4:
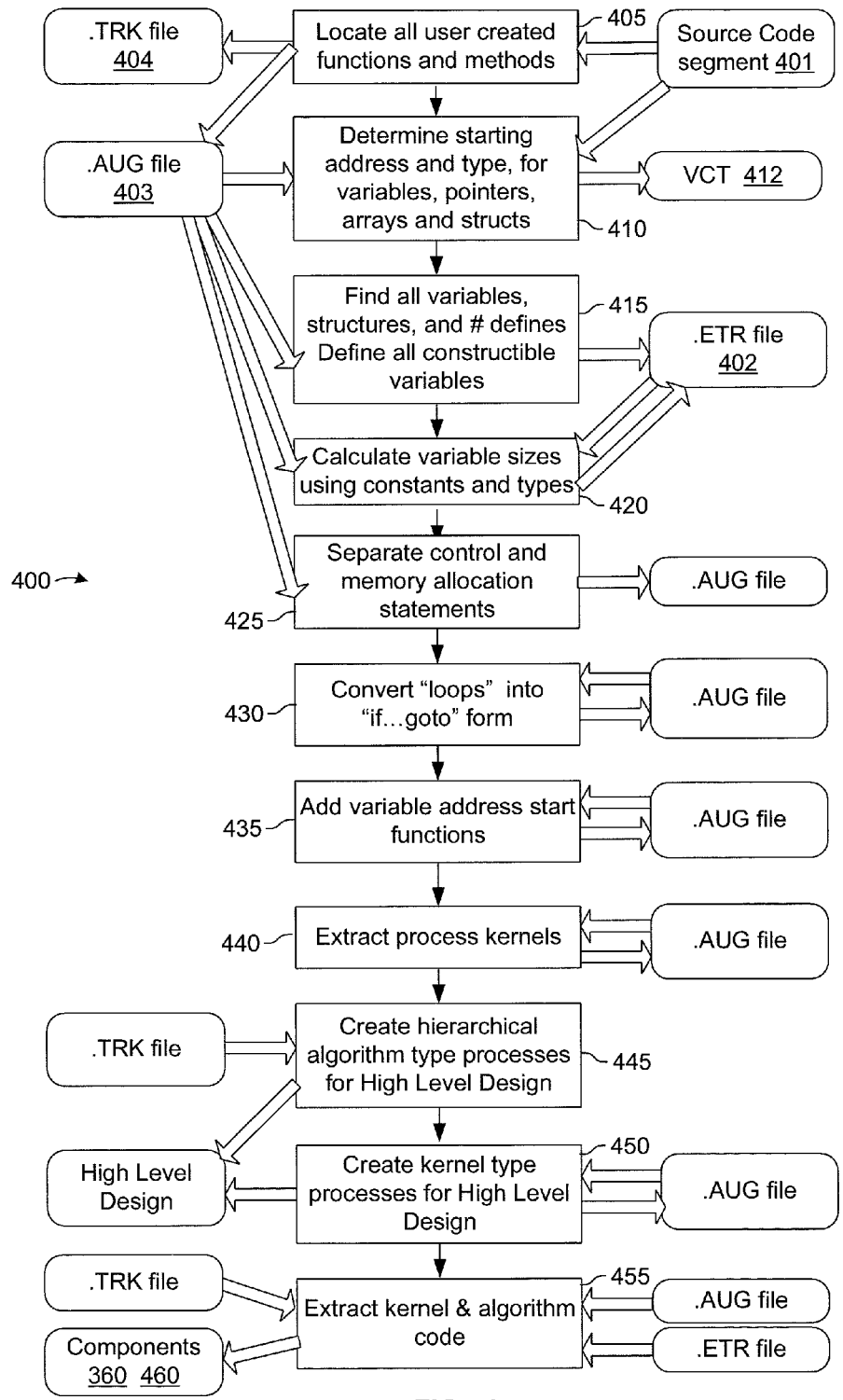
FIG. 4 is a flowchart of a detailed exemplary algorithm for automatically extracting designs from standard source code.

FIG. 4 is a detailed exemplary algorithm 400 for automatically extracting designs from standard source code. As shown in FIG. 4, initially, a system user locates the desired source code segment 401 in the file containing the computer program whose design is to be extracted. An example of a C language code segment 401 is shown below in Table 4. This example is used throughout the remainder of this document.

TABLE 4

```
#include <stdlib.h>
#include <stdio.h>
#define BUFFERSIZE 1024*1024
typedef struct {
```

TABLE 4-continued

```
    unsigned int buffer1[BUFFERSIZE];
    unsigned int buffer2[BUFFERSIZE];
    char test[12];
} sample_buffer;
typedef struct {
    int test1
    int test2
    int test3
} sample_buffer1;
typedef struct {
    sample_buffer *sample_buffer2;
    char test[12];
} buffer_info;
int main(int argc, char *argv[]) {
    unsigned int index;
    char test_string[10];
    buffer_info *bufferinfo;
    sample_buffer1 *sampleinfo;
    if (( bufferinfo =   (buffer_info *) malloc(
sizeof(buffer_info) ) ) == NULL) {
        printf("ERROR ALLOCATING bufferinfo\n");
        goto cleanup2;
    }
    if (( bufferinfo->sample_buffer2= (sample_buffer *)
malloc( sizeof(sample_buffer) ) ) == NULL) {
        printf("ERROR ALLOCATING bufferinfo->mybuffer\n");
        exit;
    }
    if (( sampleinfo = (sample_buffer1 *) malloc(
sizeof(sample_buffer1) ) ) == NULL) {
        printf("ERROR ALLOCATIONS sampleinfo\n");
        goto cleanup1;
    }
    for (index = 0; index >= sizeof(buffer_info); index++){
        Bufferinfo->sample_buffer2->buffer1[index] = index;
        Bufferinfo->sample_buffer2->buffer2[index] = index +
1;
    }
    bufferinfo->sample_buffer2->test = "testtesttest";
    bufferinfo->test = "testtesttest";
    sampleinfo->test1 = 1;
    sampleinfo->test2 = 2;
    sampleinfo->test3 = 3;
cleanup1:
    free (bufferinfo->mybuffer)
cleanup2:
    free (bufferinfo)
    return (0);
```

Extracting Subroutines

All procedural computer languages have the concept of subroutine. A subroutine is a sequence of instructions for performing a particular task. This sequence can be called from multiple places within a computer program. Subroutines can call other subroutines, including themselves (called recursion). Subroutines that are called primarily for their return value are known as functions. In object-oriented programming, subroutines or functions with limited execution scope are called methods. Because programs can call subroutines which can call other subroutines, the hierarchical decomposition structure of a computer program is obtained by tracking the subroutine calls in that program. In present system, a single linear transformation having no process flow is called a control kernel. Multiple process kernels connected via flow control are called algorithms. Algorithms can contain other algorithms as well as kernels. This means that an algorithm is equivalent to a subroutine.

As shown in FIG. 4, at step 405 (in a C Language program, for example), the "Main" routine (or other source code segment of interest) 401 is first searched for any user-defined subroutines (e.g., user-defined functions and methods). Next, each subroutine is placed in its own file (along with any required header files). Each subroutine file is then edited to have an ".AUG" extension to create a corresponding .AUG file 403. A tracking file (".TRK") 404 is then created to track the hierarchy of the subroutines. In one embodiment, the .TRK file has the following format:

```
Main
    Level 1 Subroutine Name
        Level 2 Subroutine Name
            ... Level N Subroutine Name
            ... Level N Subroutine Name
            ...
            ... Level N Subroutine Name
        Level 2 Subroutine Name
        ...
        Level 2 Subroutine Name
    Level 1 Subroutine Name
    ...
    Level 1 Subroutine Name
```

Extracting Variables

Almost all control structures require accessing variables, pointers, and/or arrays. The control (looping) statement below is an example:

For (index=0; count>=sizeof(buffer_info); index++)

The statement above requires that the variable index be accessed. Accessing variables, pointers, and arrays requires determining their starting address and type. Therefore, at step 410, the starting address and type is determined for each of these entities.

In the case of "buffer_info", it also requires running "malloc( )" and "sizeof( )" functions prior to running the entire code segment to determine the number of bytes used by the "buffer_info" data structure.

In the C and C++ languages, the use of the following commands creates the required dynamic memory allocation: "malloc( )", "calloc( )", "realloc( )", and "new type ( )". In addition, there are arrays that are dynamically allocated at runtime. All of these structures dynamically allocate heap space. Thus, for every command that dynamically allocates memory, the required dynamic memory allocation is created for each routine for each program thread. The C language also has the ability to take the address of any variable and write any value starting at that address.

Table 5, below, shows the extracted variables, constants, structures, and #defines (all of which are highlighted) for the example code segment shown in Table 4. This table is known as the Variables and Constants Table or VCT 412.

TABLE 5

| Variable # | Variable/Constant/ Pointers/Arrays/Structs/ #Define Names (Main) | Types | # of Bytes | Sizeof( ) | Constant value |
|---|---|---|---|---|---|
| 1 | BUFFERSIZE | #define | 0 | — | 1,048,576 |
| 2 | sample_buffer | struct | 0 | 8,388,620 | — |
| 3 | sample_buffer1 | struct | 0 | 12 | — |
| 4 | buffer_info | struct | 0 | 14 | — |
| 5 | index | uint | 4 | 4 | — |

TABLE 5-continued

| Variable # | Variable/Constant/Pointers/Arrays/Structs/#Define Names (Main) | Types | # of Bytes | Sizeof( ) | Constant value |
|---|---|---|---|---|---|
| 6 | test_string | array | 10 | 10 | — |
| 7 | bufferinfo | pointer | 4 | 4 | — |
| 8 | bufferinfo->sample_buffer2 | pointer | 4 | 4 | — |
| 9 | bufferinfo->sample_buffer2->buffer1 | array | 4,194,304 | 4,194,304 | — |
| 10 | bufferinfo->sample_buffer2->buffer2 | array | 4,194,304 | 4,194,304 | — |
| 11 | Buffer->sample_buffer2->test | array | 10 | 10 | — |
| 12 | bufferinfo->buffer1 | array | 4,194,304 | 4,194,304 | — |
| 13 | bufferinfo->buffer2 | array | 4,194,304 | 4,194,304 | — |
| 14 | bufferinfo->test | variable | 10 | 10 | — |
| 15 | sampleinfo | pointer | 4 | 4 | — |
| 16 | sampleinfo->test1 | variable | 4 | 4 | — |
| 17 | sampleinfo->test2 | variable | 4 | 4 | — |
| 18 | sampleinfo->test3 | variable | 4 | 4 | — |
| RAM used | | | 16,777,274 | — | — |

The variables, pointers, and arrays shown in Table 5 are constructed variables. Constructed variables are all possible variables that can be constructed using the structure definitions given. Not all constructed variables are used in the present sample code, but all are possible.

Before variables can be extracted, the "#defines" and "structs" are extracted by parsing these elements from the source code, at step 415, wherein the source code file is opened and scanned for any "#defines" or "structs". Any found items are placed into a file 402 with the same name as the source code file but with an ".ETR" file name extension. In Table 6, below, the found "#defines" and "structs" are indicated by italics.

TABLE 6

```
#include <stdlib.h>
#include <stdio.h>
#define BUFFERSIZE 1024*1024
typedef struct {
    unsigned int buffer1[BUFFERSIZE];
    unsigned int buffer2[BUFFERS1ZE];
    char test[10];
} sample_buffer;
typedef struct {
    int test1
    int test2
    int test3
} sample_buffer1;
typedef struct {
    sample_buffer *sample_buffer2;
    char test[10];
} buffer_info;
int main(int argc, char *argv[]) {
    unsigned int index;
    char test_string[10];
    buffer_info *bufferinfo;
    sample_buffer1 *sampleinfo;
    if (( bufferinfo = (buffer_info *) malloc(
sizeof(buffer_info) ) ) == NULL) {
        printf("ERROR ALLOCATING bufferinfo\n");
        goto cleanup2;
    }
    if (( bufferinfo->sample_buffer2= (sample_buffer *)
malloc( sizeof(sample_buffer) ) )== NULL) {
        printf("ERROR ALLOCATING bufferinfo-
>sample_buffer\n");
        exit;
```

TABLE 6-continued

```
    }
    If (( sampleinfo = (sample_buffer1 *) malloc(
sizeof(sample_buffer1) ) ) == NULL) {
        printf("ERROR ALLOCATIONS sampleinfo\n");
        goto cleanup1;
    }
    for (index = 0; index >= sizeof(buffer_info); index++) {
        Bufferinfo->sample_buffer2->buffer1[index] = index;
        Bufferinfo->sample_buffer2->buffer2[index] = index +
1;
    }
    bufferinfo->sample_buffer2->test = "testtesttest";
    bufferinfo->test = "testtesttest";
    sampleinfo->test1 = 1;
    sampleinfo->test2 = 2;
cleanup1:
    free (bufferinfo->mybuffer);
cleanup2:
    free (bufferinfo);
    return (0);
}
```

Table 7, below, shows the placement of a function that is used within the source code file of the example code to update the "ETR" file 402. In the present example, the function "mptStartingAddressDetector( )" (or equivalent), highlighted in bold text below, is used to determine the starting address of the "malloc( )'ed" variables. The starting addresses are then stored by the system. The newly augmented source code file 403 uses the same name as the source code segment file 401 with the file extension changed to ".AUG".

At step 425, control and memory allocation statements are separated by modifying the "if" control statements that contained "malloc( )" commands by separating the "malloc( )" function from each "if" statement.

TABLE 7

Augmented source code file

```
#include <stdlib.h>
#include <stdio.h>
#define BUFFERSIZE 1024*1024
typedef struct {
```

TABLE 7-continued

Augmented source code file

```
    unsigned int buffer1[BUFFERSIZE];
    unsigned int buffer2[BUFFERSIZE];
    char test[10];
} sample_buffer;
typedef struct {
    int test1
    int test2
    int test3
} sample_buffer1;
typedef struct {
    sample_buffer *sample_buffer2;
    char test[10];
} buffer_info;
int main(int argc, char *argv[]) {
    char *fileName;
    FILE *fileNamePointer;
    strcpy(mptFile,argv[0]);
    strcat(mptFile, ".ETR");
    mptStartingAddressStart(filename,fileNamePointer);
    unsigned int index;
    mptStartingAddressDetector(fileNamePointer, "index",
(uint) &index);
        char test_string[10];
    mptStartingAddressDetector(fileNamePointer,
"test_string", (uint)&test_string);
    buffer_info *bufferinfo;
    sample_buffer1 *sampleinfo;
    bufferinfo = (buffer_info *) malloc(sizeof(buffer_info));
    if (bufferinfo == NULL) {
        printf("ERROR ALLOCATING bufferinfo\n");
        goto cleanup2;
    }
    mptStartingAddressDetector(fileNamePointer,
        "bufferinfo",
        (uint) bufferinfo);
    mptStartingAddressDetector(fileNamePointer,
        "bufferinfo->test",
        (uint) bufferinfo->test);
    bufferinfo->sample_buffer2= (sample_buffer *) malloc(
sizeof(sample_buffer));
    if (bufferinfo->sample_buffer2 == NULL) {
        printf("ERROR ALLOCATING bufferinfo-
>sample_buffer2\n");
        mptStartingAddressEnd (fileNamePointer);
        exit();
    }
    mptStartingAddressDetector(fileNamePointer,
        "bufferinfo->sample_buffer2",
        (uint) bufferinfo->sample_buffer2);
    mptStartingAddressDetector(fileNamePointer,
        "bufferinfo->sample_buffer2->buffer1[]",
        (uint) bufferinfo->sample_buffer2-
>buffer1);
    mptStartingAddressDetector(fileNamePointer,
        "bufferinfo->sample_buffer2->buffer2[]",
        (uint) bufferinfo->sample_buffer2-
>buffer2);
    mptStartingAddressDetector(fileNamePointer,
        "bufferinfo->sample_buffer2->test",
        (uint) bufferinfo->sample_buffer2->test);
    sampleinfo =
(sample_buffer1*)malloc(sizeof(sample_buffer1));
    mptStartingAddressDetector(fileNamePointer,
        "sampleinfo",
        (uint) sampleinfo);
    if (sampleinfo == NULL) {
        printf("ERROR ALLOCATIONS sampleinfo\n");
        goto cleanup1;
    }
    index = 0;
MPTForLoop1:
    If (index < sizeof(buffer_info){
        bufferinfo->sample_buffer2->buffer1[index] =
indexbufferinfo->sample_buffe2->buffer2[index] = index + 1;
        index++;
        goto MPTForLoop1;
    }
    bufferinfo->sample_buffer2->test = "testtesttest";
```

TABLE 7-continued

Augmented source code file

```
    bufferinfo->test = "testtesttest";
    sampleinfo->test1 = 1;
    sampleinfo->test2 = 2;
cleanup1:
    free (bufferinfo->sample_buffer2);
cleanup2:
    free (bufferinfo);
    mptStartingAddressEnd (fileNamePointer);
    return (0);
}
mptStartingAddressStart(char *fileName, File *mptFilePointer)
{
    FILE *fopen();
    if (fileName == NULL) {
        printf ("illegal file name");
        exit (10000) ;
    }
    else {
        if (mptFilePointer = fopen(mptFile, "a")== NULL) {
            printf ("Cannot open file");
            exit(10001);
        }
    }
    return (0);
}
mptStartingAddressDetector (File *fileNamePointer, char
*variableName, uint address)
{
    fprintf(fileNamePointer, "variable Name: "%s" Address:
"%u,variableName, address);
    return(0);
}
mptStartingAddressEnd (File *fileNamePointer) {
    fclose (fileNamePointer);
}
```

Next, "for loops" are converted into an "if . . . goto" form, at step 430. The "if . . . goto" form exposes the process kernel and a control vector.

At step 435, at the beginning of the code segment 401, the function "mptStartingAddressStart( )" is inserted into the code segment 401. When the "mptStartingAddressStart( )" is then called, it opens the ETR file with the same name as the source code file, but with the file extension set to "ETR". Prior to any program exit or return call, the "mptStartingAddressEnd( )" function is called, which closes the ETR file. See table 5. All language-defined functions/methods are treated as part of the language, rather than as user defined functions or methods. In the case of the C language, this means that code blocks are not extracted from the function types listed in Table 8, below, which shows the C language functions:

TABLE 8

| Index # | C Language Function Name |
|---------|--------------------------|
| 1       | Alloc ( )                |
| 2       | Atoi ( )                 |
| 3       | Binary ( )               |
| 4       | Bitcount ( )             |
| 5       | Calloc ( )               |
| 6       | Clear ( )                |
| 7       | Close ( )                |
| 8       | Copy ( )                 |
| 9       | Creat ( )                |
| 10      | Directory ( )            |
| 11      | Fgets ( )                |
| 12      | Filecopy ( )             |
| 13      | Fopen ( )                |
| 14      | Fprintf ( )              |

TABLE 8-continued

| Index # | C Language Function Name |
|---|---|
| 15 | Fputs ( ) |
| 16 | Free ( ) |
| 17 | Fsize ( ) |
| 18 | Getbits ( ) |
| 19 | Getc ( ) |
| 20 | Getch ( ) |
| 21 | Getchar ( ) |
| 22 | Getint ( ) |
| 23 | Getline ( ) |
| 24 | Getop ( ) |
| 25 | Getword ( ) |
| 26 | Hash ( ) |
| 27 | Install ( ) |
| 28 | Itoa ( ) |
| 29 | Lookup ( ) |
| 30 | Lower ( ) |
| 31 | Lseek ( ) |
| 32 | Malloc ( ) |
| 33 | Numcmp ( ) |
| 34 | Open ( ) |
| 35 | Pop ( ) |
| 36 | Printd ( ) |
| 37 | Printf ( ) |
| 38 | Push ( ) |
| 39 | Putc ( ) |
| 40 | Putchar ( ) |
| 41 | Read ( ) |
| 42 | Readlines ( ) |
| 43 | Return ( ) |
| 44 | Reverse ( ) |
| 45 | Scanf ( ) |
| 46 | Seek ( ) |
| 47 | Shell ( ) |
| 48 | Sort ( ) |
| 49 | Sprint ( ) |
| 50 | Squeeze ( ) |
| 51 | Strcat ( ) |
| 52 | Strcmp ( ) |
| 53 | Strcpy ( ) |
| 54 | Strlen ( ) |
| 55 | Strsave ( ) |
| 56 | Sscanf ( ) |
| 57 | Swap ( ) |
| 58 | System ( ) |
| 59 | Talloc ( ) |
| 60 | Tree ( ) |
| 61 | Treeprint ( ) |
| 62 | Type ( ) |
| 63 | Ungetc ( ) |
| 64 | Ungetch ( ) |
| 65 | Unlink ( ) |
| 66 | Write ( ) |
| 67 | Writelines ( ) |

Extracting Process and Control Kernels

At step 440, the present system accesses the ".AUG" file 403 and creates a set of kernel files. Each kernel file includes the source code file name concatenated with either the letter P (for process) or the letter C (for control), along with consecutive numbering. Examples of kernel file names are shown below:

sourceCodeFile_P1( ), sourceCodeFile_P2( ), . . . , sourceCodeFile_PN( )

or

SCF_P1( ), SCF_P2( ), . . . , SCF_PN( )

sourceCodeFile_C1( ), sourceCodeFile_C2( ), . . . , sourceCodeFile_CN( )

or

SCF_P1( ), SCF_C2( ), . . . , SCF_CN( )

Each added kernel indicates that it has completed, using the MptReturn kernel tracking variable. In an exemplary embodiment, this tracking variable is a sixty-four bit integer variable that saves the same process number as is placed on the kernel file name. The kernel number is placed prior to exiting the kernel. The "MptReturn" kernel variable is used by the MPT state machine to perform linear kernel transitions. The structural difference between a kernel and a function (in the C language) occurs at the parameter level.

A function has a parameter list, that is, an ordered group of input/output variables used by other functions and the main program to communicate with the target function. The information is communicated using either pass-by-reference or pass-by-value techniques. The only difference between the two techniques is that a copy of the data is created and made accessible when the pass-by-value technique is used, while a pointer to the actual data location is used during pass-by-reference.

The ordered-list nature of the parameter list adds a barrier to using a particular function. A kernel uses a parameter set, not a parameter list, so the order of the parameters makes no difference. Before a kernel can be made, the functions that will become the kernels must be generated. These functions are called proto-process kernels, and the example in Table 9, below, shows how they are extracted.

TABLE 9

```
#include <stdlib.h>
#include <stdio.h>
#define BUFFERSIZE 1024*1024
typedef struct {
    unsigned int buffer1[BUFFERSIZE];
    unsigned int buffer2[BUFFERSIZE];
    char test[10];
} sample_buffer;
typedef struct {
    int test1
    int test2
    int test3
} sample_buffer1;
typedef struct {
    sample_buffer *samplebuffer2;
    char test[10];
} buffer_info;
int_64 MptLastReturnedKernal = 0;
int main(int argc, char *argv[]) {
    unsigned int index;
    mptStartingAddressDetector(argv[0],".ETR", "index",
&index);
        char test_string[10];
    mptStartingAddressDetector(argv[0],".ETR",
"test_string",&test_string);
    buffer_info *bufferinfo;
    sample_buffer1 *sampleinfo;
    if(MptReturn == 0) SCF_P1 (bufferinfo);
    if (bufferinfo == NULL) {
        printf("ERROR ALLOCATING bufferinfo\n");
        goto cleanup2;
    }
    mptStartingAddressDetector(argv[0],
        ".ETR",
        "bufferinfo",
        bufferinfo);
    mptStartingAddressDetector(argv[0],
        ".ETR",
        "bufferinfo->test",
        bufferinfo->test);
    if (MptReturn == 1) SCF_P2 (bufferinfo->sample_buffer2);
    if (bufferinfo->sample_buffer2 == NULL) {
        printf("ERROR ALLOCATING bufferinfo-
>sample_buffer2\n");
        exit;
    }
    mptStartingAddressDetector(argv[0],
        ".ETR",
        "bufferinfo->sample_buffer2",
        bufferinfo->sample_buffer2);
    mptStartingAddressDetector(argv[0],
```

TABLE 9-continued

```
            ".ETR",
            "bufferinfo->sample_buffer2->buffer1[]",
            bufferinfo->sample_buffer2->buffer1);
        mptStartingAddressDetector(argv[0],
            ".ETR",
            "bufferinfo->sample_buffer2->buffer2[]",
            bufferinfo->sample_buffer2->buffer2);
        mptStartingAddressDetector(argv[0],
            ".ETR",
            "bufferinfo->sample_buffer2->test",
            bufferinfo->sample_buffer2->test);
        if (MptReturn == 2) SCF_P3 (sampleinfo);
        mptStartingAddressDetector(argv[0],
            ".ETR",
            "sampleinfo",
            sampleinfo);
        if (sampleinfo == NULL) {
            printf("ERROR ALLOCATIONS sampleinfo\n");
            goto cleanup1;
        }
        If MptReturn == 4) SFC_P4(index);
    MPTForLoop1:
        If (index < sizeof(buffer_info){
            If (MptReturn == 4) SFC_P5(bufferinfo, index);
            goto MPTForLoop1;
        }
        If (MptReturn == 5) SFC_P6(bufferinfo, sampleinfo);
    cleanup1:
        free (bufferinfo->sample_buffer2);
    cleanup2:
        free (bufferinfo);
        return (0);
    }
    int SCF_P1 (buffer_info *bufferinfo) {
        bufferinfo = (buffer_info *) malloc(sizeof(buffer_info));
        MptReturn = 1;
    }
    int SCF_P2 (sample_buffer *)bufferinfo->sample_buffer2)
        bufferinfo->sample_buffer2 = (sample_buffer *) malloc(
    sizeof(sample_buffer));
        MptReturn = 2;
    }
    int SCF_P3 (sample_buffer1 *sampleinfo) {
        sampleinfo =
    (sample_buffer1*)malloc(sizeof(sample_buffer1));
        MptReturn = 3;
    }
    int SCF_P4 (int index) {
        index = 0;
        MptReturn = 4;
    }
    int SCF_P5 (buffer_info *bufferinfo, int index) {
        bufferinfo->sample_buffer2->buffer1[index] = index;
        bufferinfo->sample_buffer2->buffer2[index] = index + 1;
        index++;
        MptReturn = 5;
    }
    int SCF_P6 (buffer_info *bufferinfo, sample_buffer1
    *sampleinfo) {
        bufferinfo->sample_buffer2->test = "testtesttest";
        bufferinfo->test = "testtesttest";
        sampleinfo->test1 = 1;
        sampleinfo->test2 = 2;
        MptReturn = 6;
```

Once the proto-process kernels are identified, their parameter lists are transformed into a parameter set, completing the kernel extraction process.

The proto-process kernel parameters lists are converted into parameter sets as follows:

0) The proto-kernel is named as follows. If the proto-kernel is a subroutine or method then the proto-kernel name is the subroutine or method name. If the proto-kernel equivalent to a McCabe code block then the name given is a concatenation of the source code file name an underscore, a P (for process) and a number representing the order that the kernel was created.

1) All pass-by-value and pass-by-reference parameters are converted to input parameters and assigned to an input dataflow associated with the proto-kernel name.
2) All pass-by-reference parameters are converted to output parameters and assigned to an output dataflow associated with the proto-kernel name.
3) All non-parametric pass-by-reference variables are converted to input parameters and assigned to an input dataflow associated with the proto-kernel name.
4) All non-parametric pass-by-reference variables are also converted to output parameters and assigned to an output dataflow associated with the proto-kernel name.
5) Any branch statement is associated with an input control flow whose name is composed of the letter "C" concatenated with a number representing the order that the control flow was named.
6) The conditional portion of the control statement becomes the transfer condition of the control flow.
7) A "goto" statement consists of a branch and a target code block starting position. The system encountering a "goto" statements cause a "after process xxx" condition to be placed on the control flow of the code block represented by the target code block starting position.

Groups of proto-process kernels that are linked together with control flows are considered algorithms. Groups of algorithms that are linked together with control flows are also considered algorithms.

All parameters are now associated with input and output data-flows. All input and output data-flows are associated with kernels and algorithms.

At step 445, kernels are transformed into kernel processes (they do not decompose) and, at step 450, algorithms are transformed into algorithm type processes (they do decompose). These processes are used to generate a high level design, such as that shown in the graph in FIG. 7 (described below). All kernels and algorithms are now associated with processes.

Figure 14:
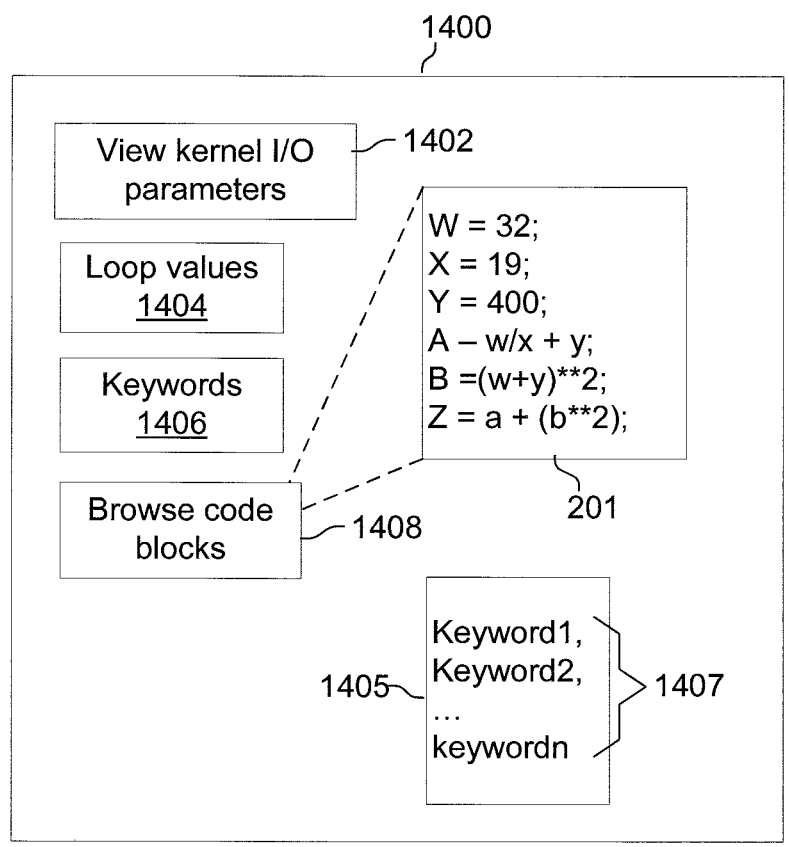
FIG. 14 is a computer screen display 1400 showing an example of how metadata can be associated with code blocks or kernels.
Figure 15:
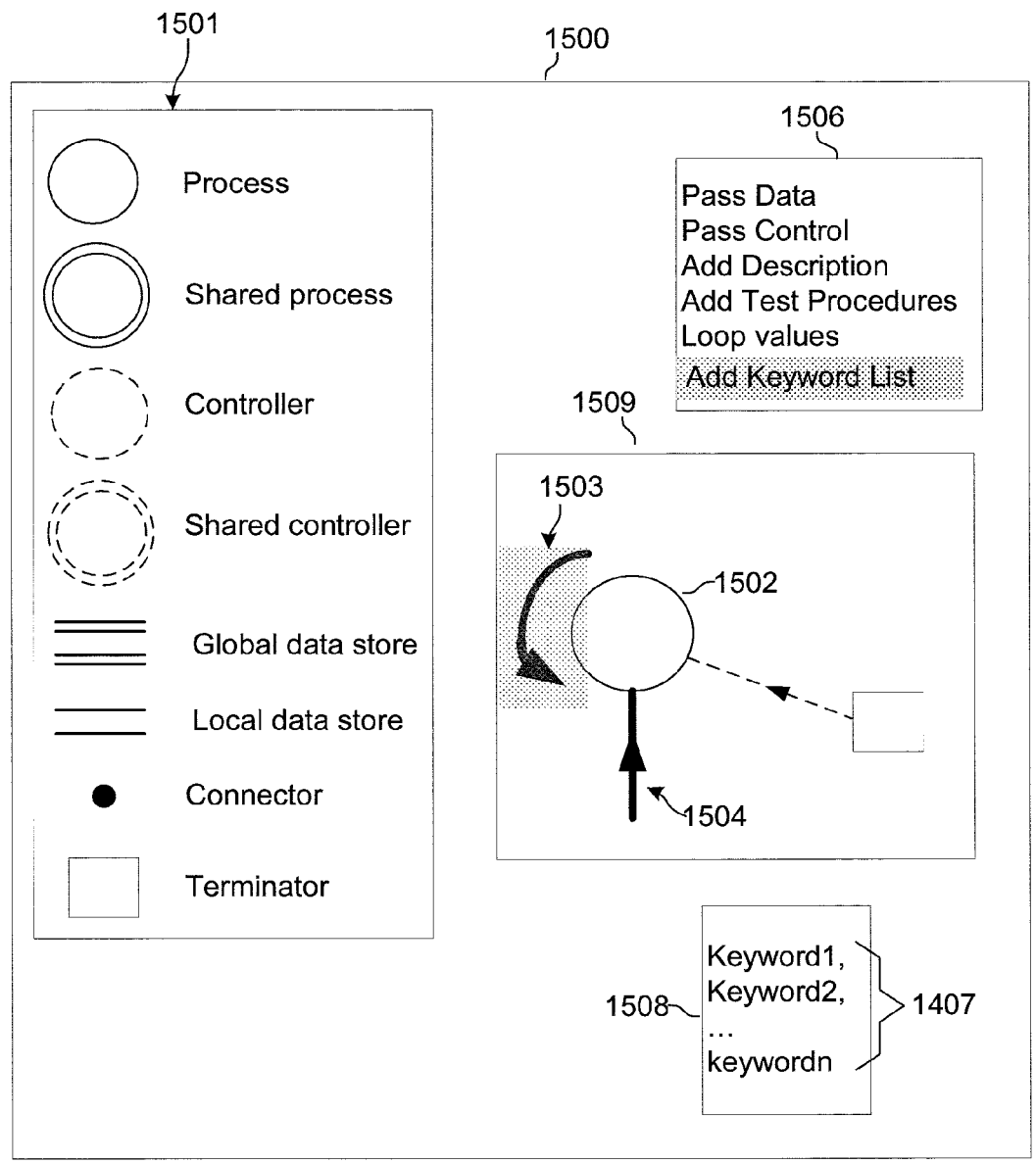
FIG. 15 is an exemplary diagram showing an initial step in one method of associating metadata with a transformation process using a computer-implemented procedure.

At step 455, kernel and algorithm code is extracted and saved as components comprising separately executable code 460 and associated meta-data 360 (e.g., keyword list 1407 (FIG. 14), etc.). This separately executable code 460 can be accessed by matching its inputs/outputs parameter types, and keyword lists to design processes with the input/output parameter types and keyword list 1507 (FIG. 15). The extracted kernel and algorithm code are called code components or more simply components.

If a parameter resolves to an address then that parameter represents a pass-by-reference. In the "C" programming language this is indicated by an asterisk in the parameter definition. Since a pass-by-reference requires that the data be copied to separate data store variables, the mptStartingAddressDetector( ) function obtains the addresses, types and sizes of all variables for the data dictionary, described in the following section.

Figure 5:
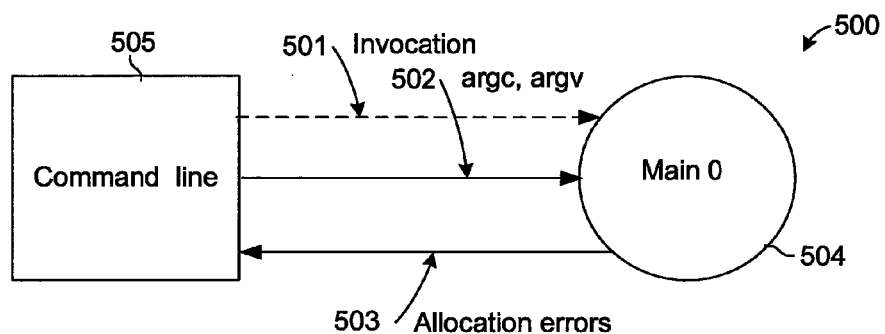
FIG. 5 shows an example of a simplified level 0.0 decomposition.

FIG. 5 is an example of a simplified level 0.0 decomposition, generated as the context level of Table 9. In the "C" programming language, the "Main" program always represents the program as a whole and its starting point, that is the context level of a decomposition diagram. As shown in FIG. 5, a command line instruction (terminator 505) invokes process 'Main 0' 504, receives argc & argv 502 data, and returns any allocation errors 503.

Figure 6:
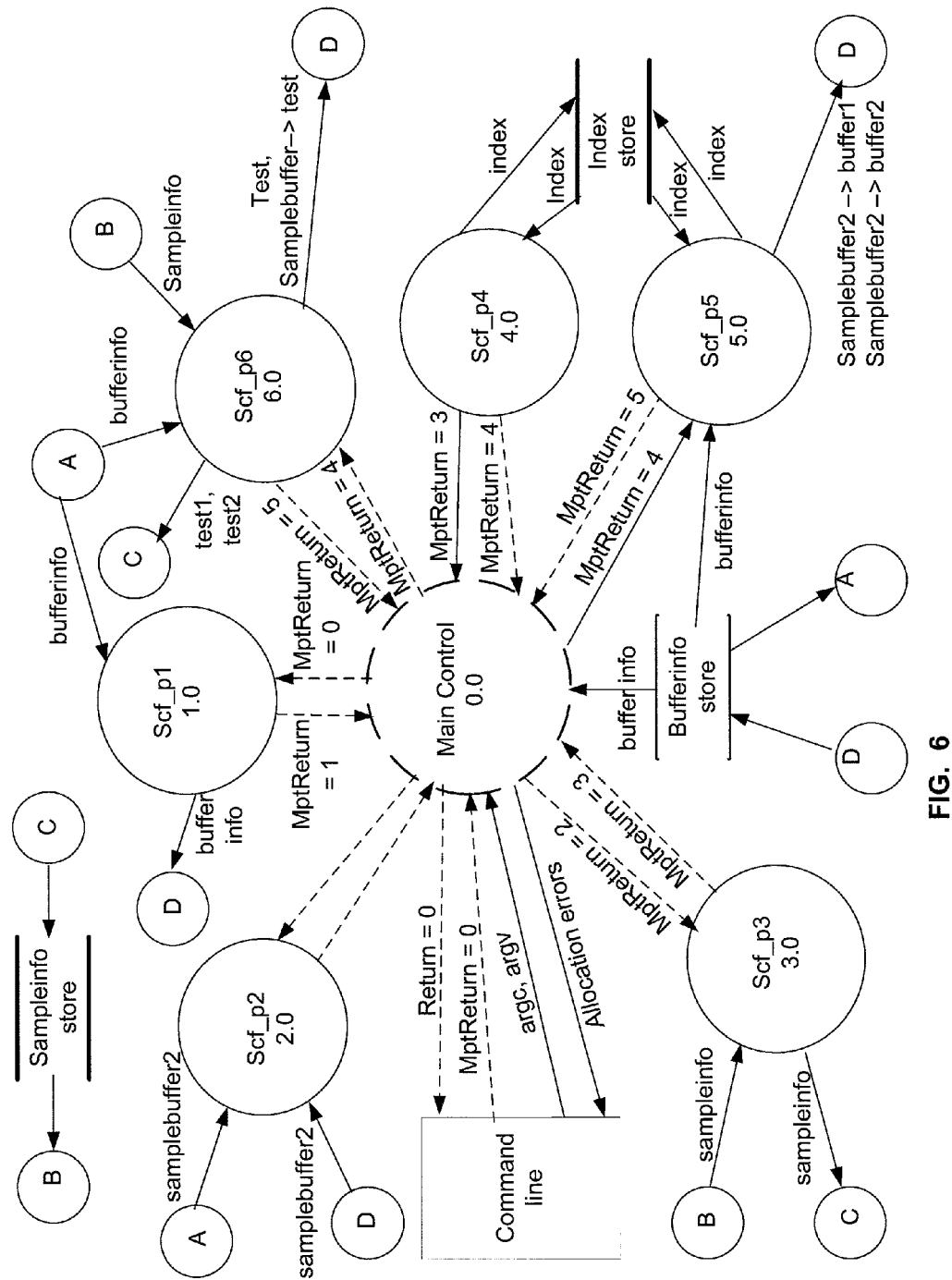
FIG. 6 shows an example of a translation of pass-by-value to the present decomposition format.

FIG. 6 shows the example code of Table 4 translated into decomposition diagrams. In the present high level design model, pass-by-reference is equivalent to a parameter simultaneously appearing on an input and an output dataflow. FIG. 6 represents the decomposition of Main, that is, all of the code blocks and user subroutines which occur within the scope of Main. All of the FIG. 6 data and control flows come from the parameters and conditions found in Main. The data stores originate as data structures within Table 9. As shown in FIG. 6, the tuple numbers found on the processes always start with a zero on decomposition level 0. When the level 0 bubble is opened, the bubble shows the contents at level 0.0. Level 0.0 contains the following process and control elements: 0.0 control bubble, 1.0 process bubble, 2.0 process bubble, etc. When one of those level 0.0 process bubbles is opened, the decomposition continues with 1.1.0, 2.1.0, etc., until all levels are accessed.

All of the interface, data movement, data storage, and control found in the original software are represented in the example decomposition diagrams. As can be seen, the example 0.0 decomposition shown in FIG. 6 is visually complex. Part of that visual complexity is the fact that all variables are shown on each data/control flow. Next, the data/control flows are assigned a simple name, with the variable names associated with that flow name.

Figure 8:
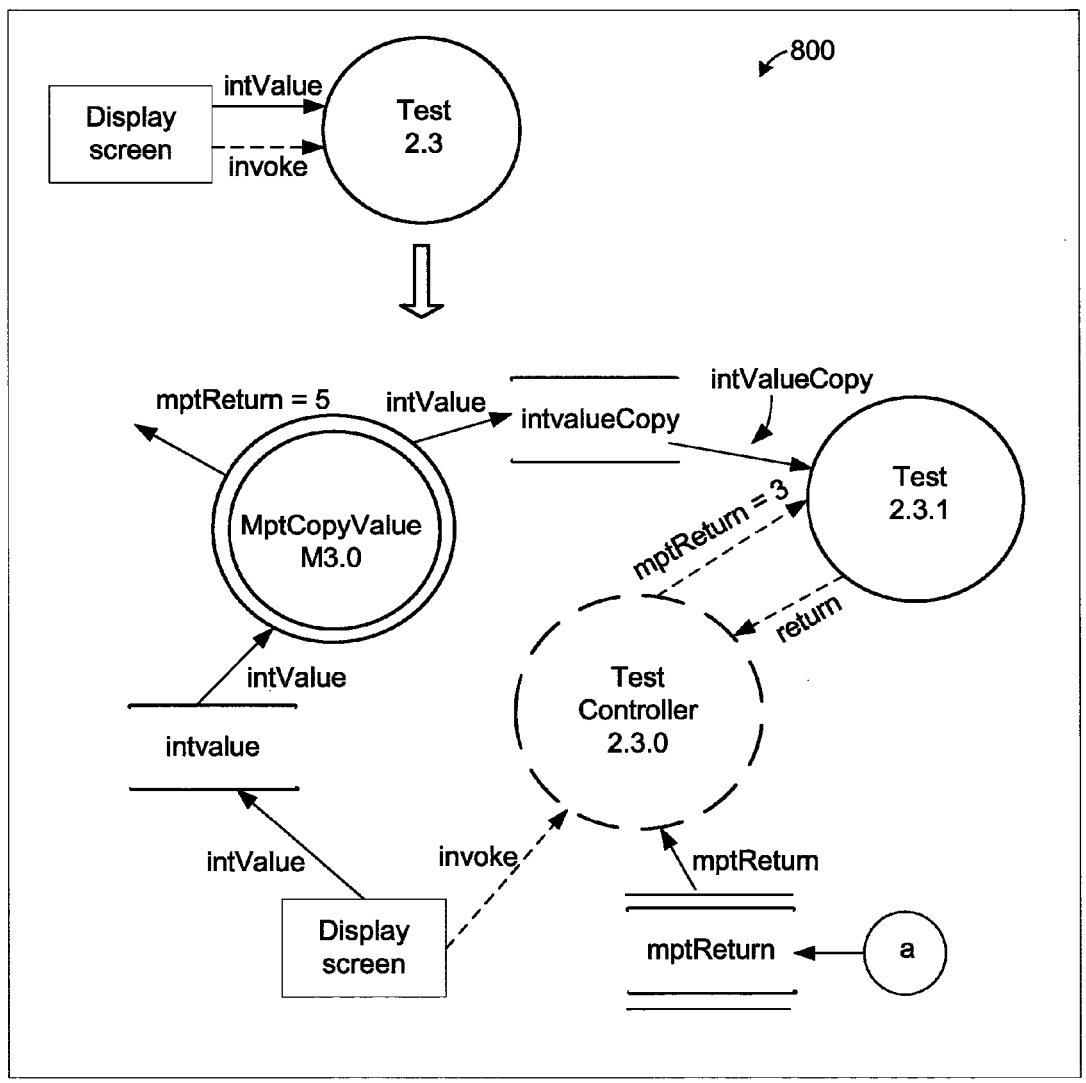
FIG. 7 and FIG. 8 illustrate examples of functional decomposition in accordance with the present method.
Figure 7:
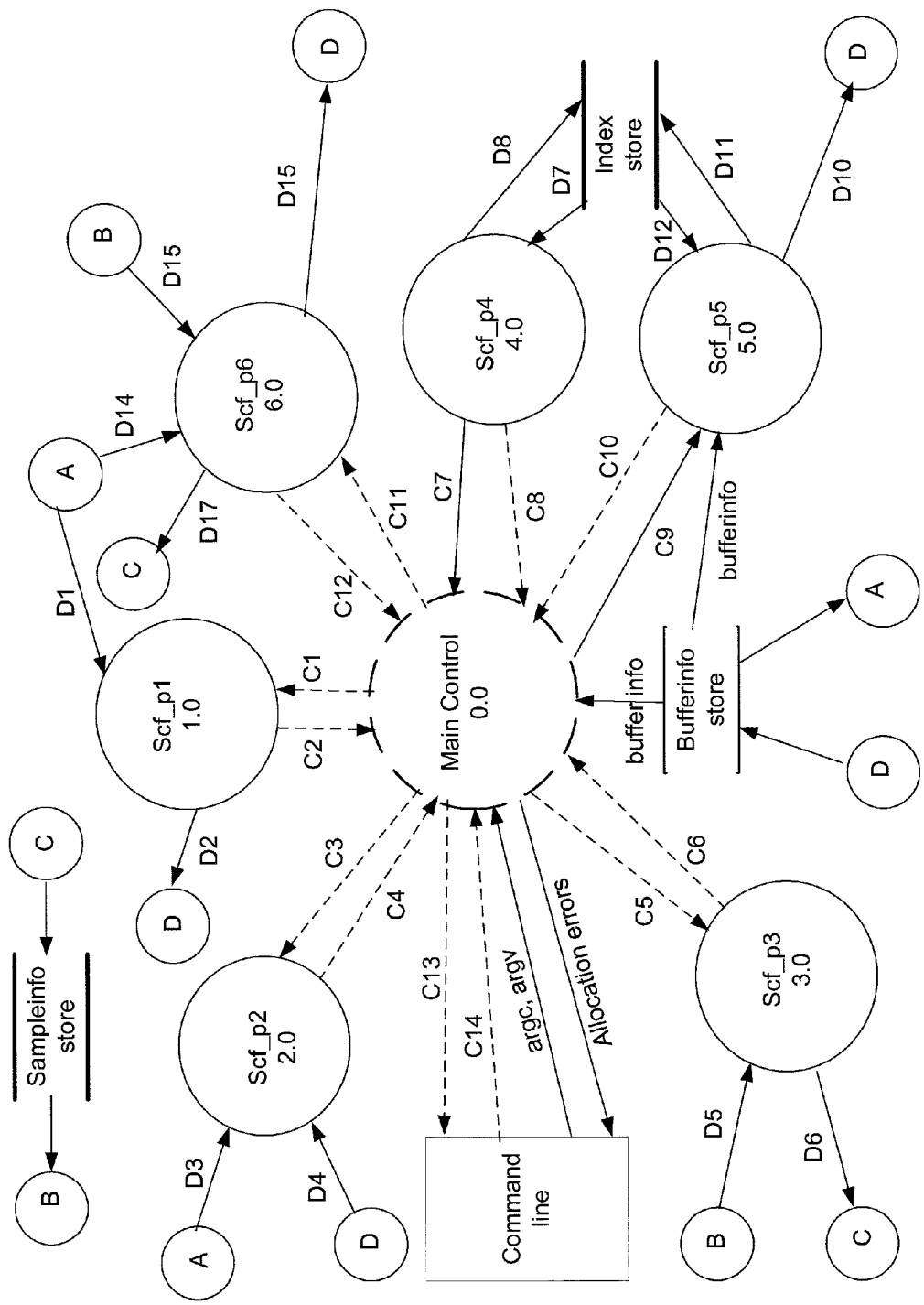

FIG. 7 and FIG. 8 illustrate examples of functional decomposition in accordance with the present method. Substituting aliases for flow names gives the simplified graphic view shown in the example of FIG. 7. The purpose of the simplified graphic view is to decrease the visual complexity of the graph, making it more understandable while retaining all relevant information.

If an input/output parameter uses pass-by-value technology, the receiving routine has an additional kernel attached called, for example, "MPTCopyValue" which performs the pass-by-value copy, as shown in the decomposition example 800 of FIG. 8. Note that the double bubble shown in FIG. 8 for "MptCopyValue" means that this is shared code. Similarly, the double lines on the "mptReturn" store mean that the store is global in nature. Although the transformation may appear more complex, it is not; what is shown more accurately describes what actually occurs when pass-by-value is performed.

Sharing Sub-Subroutine Level Software

If a system design is functionally decomposed until it reaches the point where the lowest decomposition level consists of only the "Basic Blocks" (herein called McCabe code blocks) of a program as defined in McCabe's cyclomatic complexity analysis, and as described above with respect to FIG. 4, then it becomes possible to add metadata (including, e.g., a name, I/O method, and test procedures) to those code blocks allowing them to be accessed directly. Since these code blocks do not have parameters, the associated variables must be accessed directly.

Decomposition to McCabe Code Blocks

Figure 9:
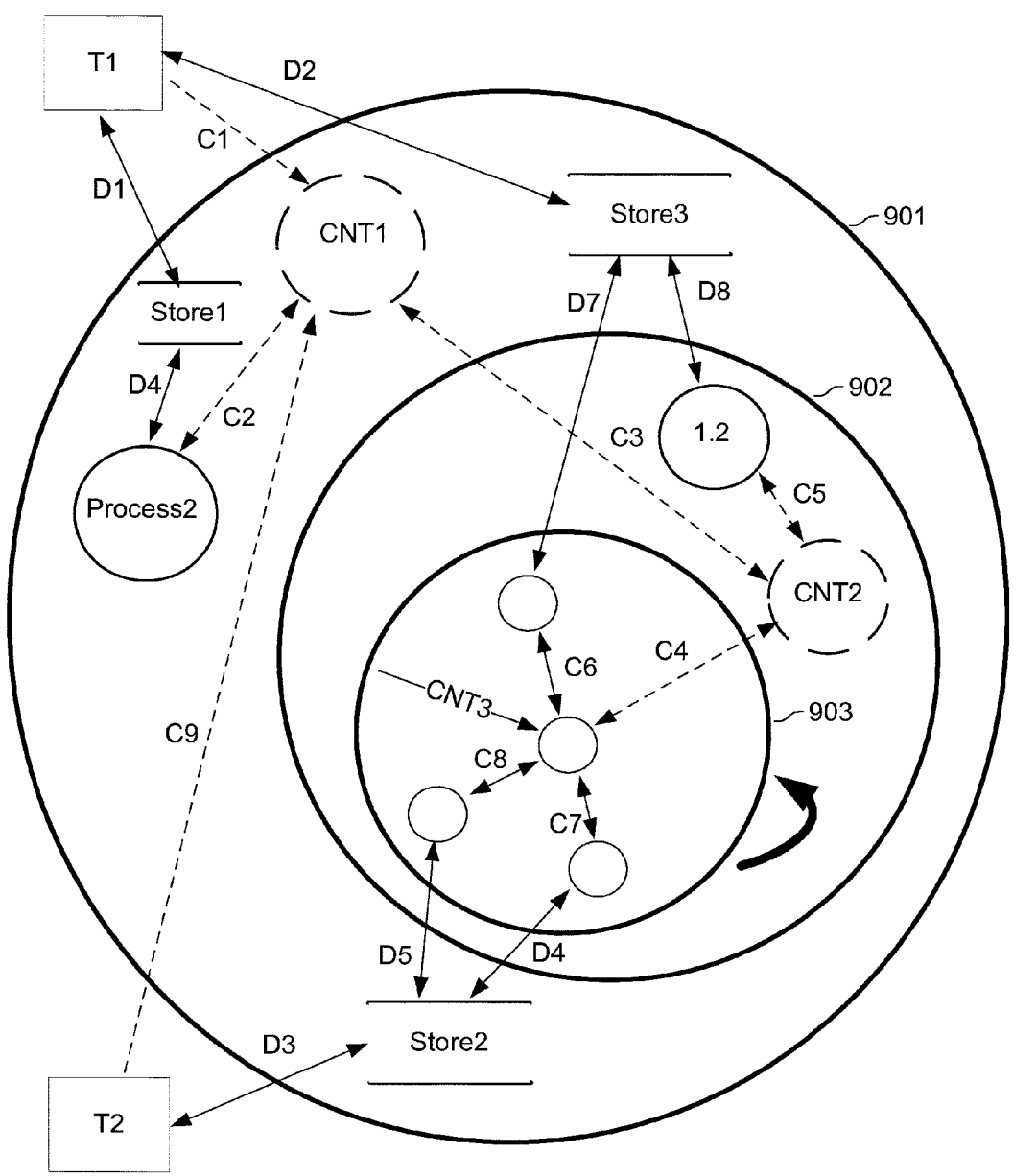
FIG. 9 is an exemplary decomposition diagram showing three decomposition levels.

FIG. 9 is an exemplary decomposition diagram showing three decomposition levels 901, 902, 903, and including terminators (T1, T2), control transformations (dashed circles), and process transformations (solid circles), and data stores.

The following are decomposition rules of the present method, which are used to generate the FIG. 9 diagram:

A control transformation evaluates conditions, sends invocations and receives returns from those invocations.

A condition contains logical mathematical expressions with variables and constants associated with a control flow.

Control transformations contain non-event control items which are conditions that change the sequence of the execution of a program (if-then-else, go to, function calls, function returns) and event control items which are interrupts.

Variables used by a control transformation can only be used in a condition.

A control transformation can have only one selection condition per transformation.

There can be, at most, one control transformation per decomposition level.

A process transformation accepts, produces and transforms data.

Process transformations decompose (analogous to functional decomposition diagrams) into less complex transformations.

A process transformation cannot directly call another process transformation on the same or higher decomposition level.

Data can only be passed to a process transformation using a data store, not directly.

The direct return from a transformation can be used as a condition.

Terminators represent extra-system activity; typically a terminator symbol represents a display screen or another separate system.

Figure 10:
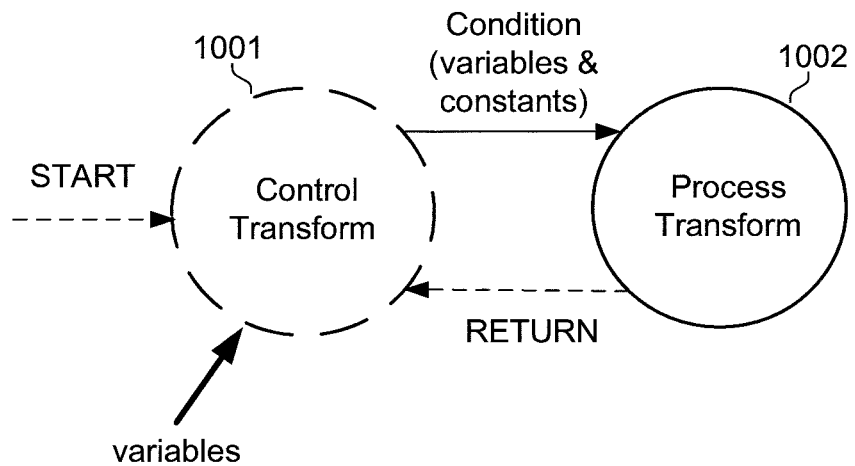
FIG. 10 and FIG. 11 show exemplary relationships between control transforms, process transforms, data stores and terminators.
Figure 11:
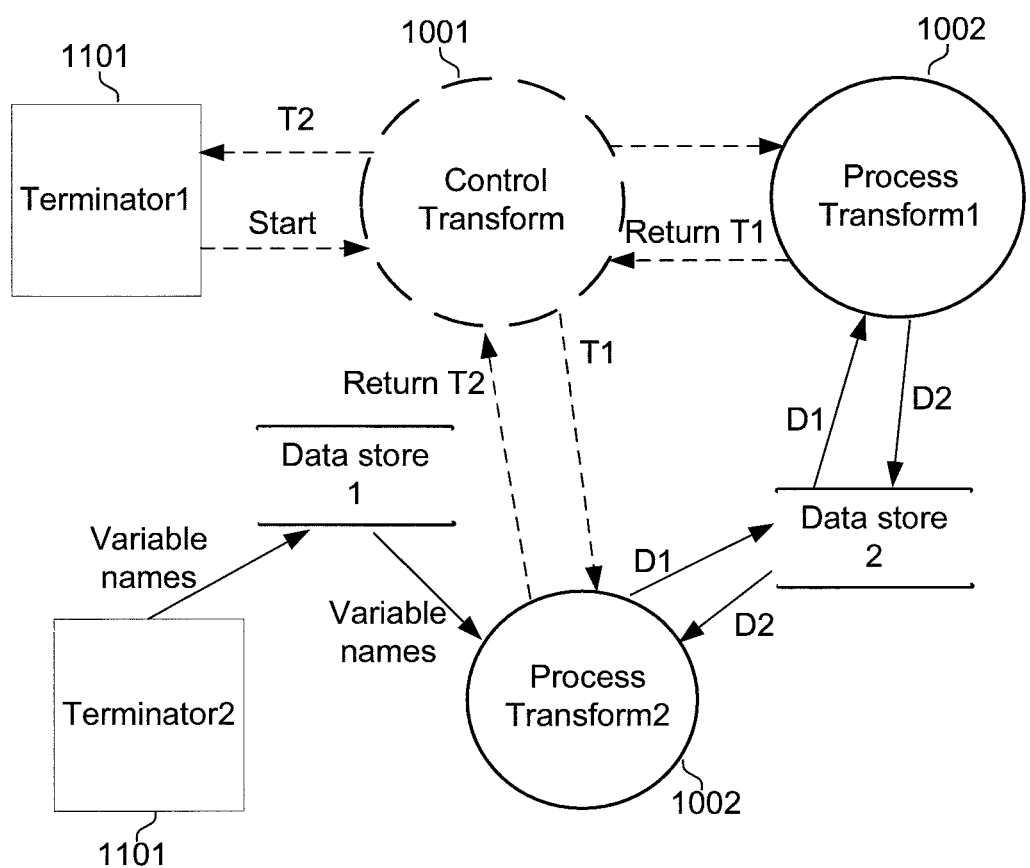

FIG. 10 and FIG. 11 show exemplary relationships between control transforms, process transforms, data stores and terminators, in accordance with the above decomposition rules. In FIGS. 10 and 11, control transforms 1001 are indicated by a dashed circle, process transforms are indicated by a non-dashed circle, and terminators are indicated by a rectangle.

Figure 12:
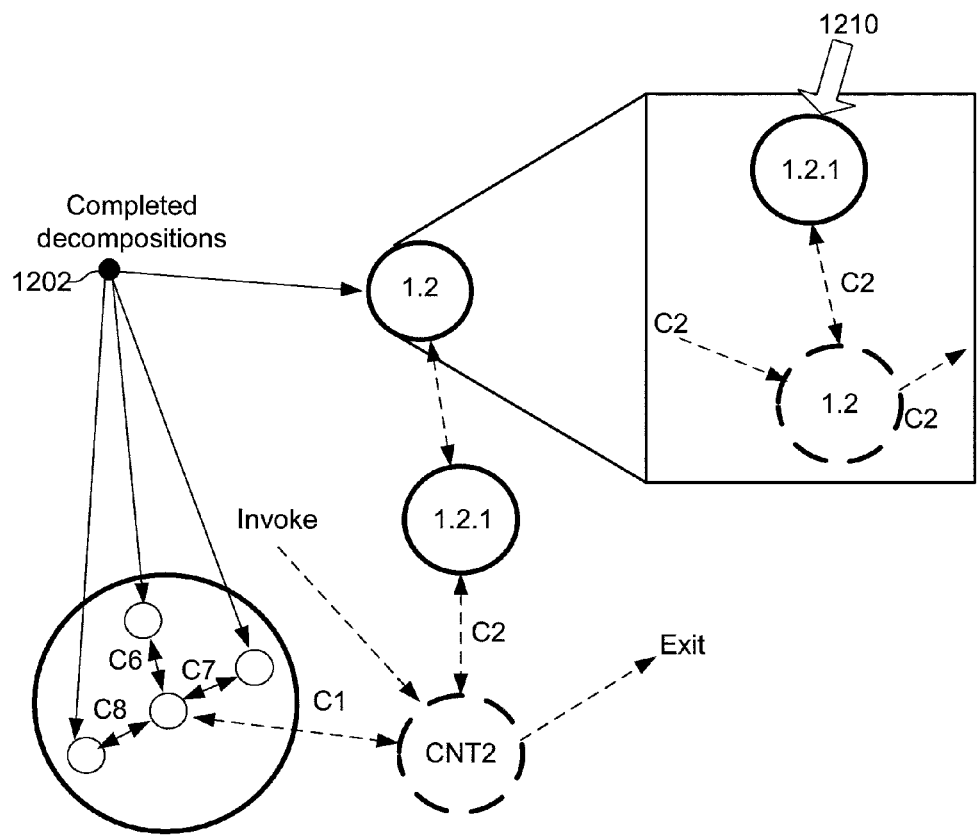
FIG. 12 shows an exemplary decomposition carried to a McCabe code block level.

FIG. 12 shows an exemplary decomposition carried to a McCabe code block level. When a transformation can no longer decompose, then that lowest-level process transformation can be associated with a code block (linear code with no control structure, equivalent to a McCabe code block), e.g., bubble 1.2 in FIG. 12. Decomposition terminates when an attempt at decomposition results in a single process (transformation) at the next lower decomposition level, as indicated by arrow 1210. In FIG. 12, completed decompositions are indicated by arrows 1202.

Figure 12A:
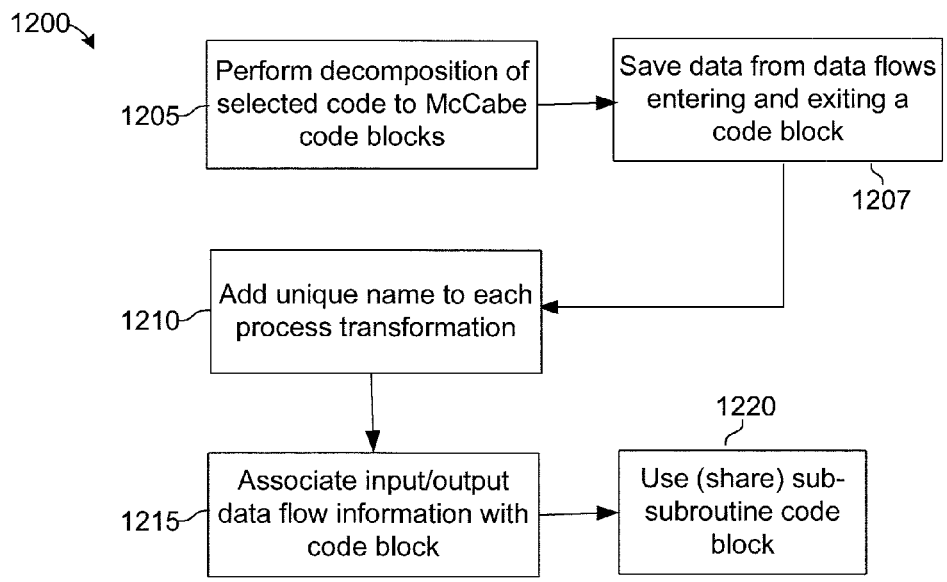
FIG. 12A is a flowchart showing an exemplary set of high-level steps performed in sharing sub-subroutine level software.

FIG. 12A is a flowchart 1200 showing an exemplary set of high-level steps performed in sharing sub-subroutine level software. As shown in FIG. 12A, at step 1205, decomposition to McCabe code blocks insures that all possible code blocks are accessible. At step 1207, data from the data flows (solid arrows) entering and exiting a McCabe code block is then saved as associated metadata which describes the input/output parameters that are used to match design processes with kernel and/or algorithm code. Thus the data in these data flows behaves as metadata. At step 1210, a unique name is added to the process transformation at the McCabe code block level (called an MPT process), and at step 1215, the input/output data flow information for that code block is associated with the code block, allowing all code blocks, i.e., sub-subroutines, to be shared (step 1220), eliminating the overhead of only sharing entire subroutines.

Automatic Code/File/Database Search/Test/Design Association

Metadata

For automatic association of code with database search/test/design in accordance with the present method, code-associated metadata comprises a keyword list 1407 for each McCabe code block and a list of all inputs and outputs to/from the code block. Similarly, in an exemplary embodiment, each decomposition design element (process bubble) also has an associated keyword list, input/output list (from the design), and associated test procedures.

Figure 13:
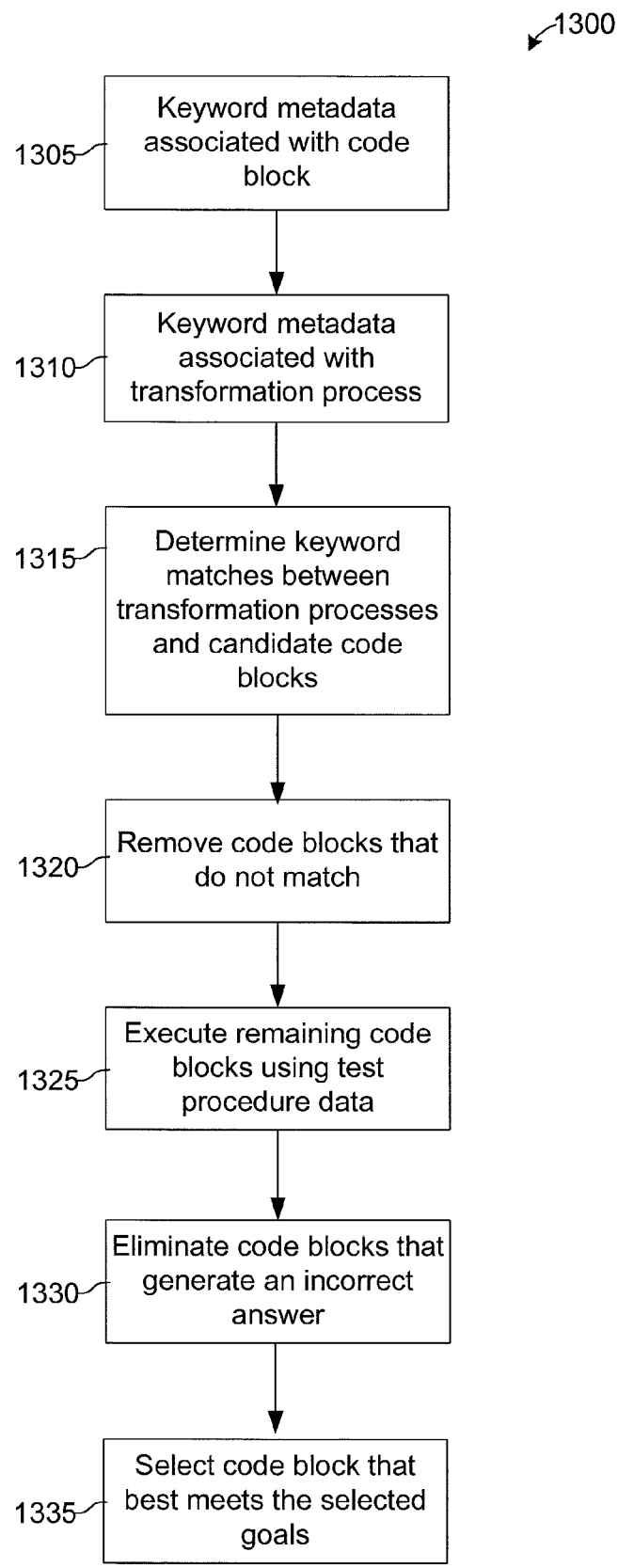
FIG. 13 is a flowchart showing an exemplary set of steps performed in associating code/files/databases and design.

FIG. 13 is a flowchart 1300 showing an exemplary set of steps performed by the present system in associating code/ files/databases and corresponding design. Operation of the present system is best understood by viewing FIGS. 14-18 (described below) in conjunction with FIG. 13. FIG. 14 is a computer screen display 1400 (generated, e.g., by processor 101) showing an example of how metadata can be associated with code blocks or kernels. As shown in FIG. 14, exemplary screen display 1400 includes user-selectable buttons that invoke functions (executed on processor 101, for example) including browsing of code blocks 201 (via 'browse code blocks' button 1408), allowing entry and viewing of keywords (via 'keywords' button 1406), setting and viewing loop values (via 'loop values' button 1404), and viewing kernel I/O parameters (via button 1402). As shown in FIG. 13, at step 1305, keyword metadata is associated with a code block. In one example, a 'keywords' button 1406 is selected, which causes a keyword drop-down box 1405 to be displayed, in response to which, a list 1407 of keywords (or other appropriate data) and optional test procedures, to be associated with the selected code block, is entered in box 1405. Keyword list 1407 thus provides the correspondence between code blocks and keywords, and may be stored in storage area 190.

FIG. 15 is an exemplary diagram showing an initial step in one method of associating metadata with a transformation process using a computer-implemented procedure. Block 1501 shows a legend indicating exemplary types of graphical indicators used by the present system to indicate decomposition objects. After a transformation process of interest is located and selected, keyword metadata is associated with the transformation process through a graphically-displayed list 1506 (on screen 1500) of keywords and test procedures (such as the process indicated by bubble 1502 in FIG. 15), at step 1310 (FIG. 13), Once a code block has been displayed on screen 1500 in block 1509, a decomposition object function, such as "Add keyword list", is selected in a drop-down box 1506, in response to which, a list 1507 of keywords (or other appropriate data) to be associated with the code block is entered in block 1508. When the user has completed entering the desired information (such as a group of keywords), the association between the entered information and the selected object is stored in keyword list 1507 in digital memory (e.g., in data and program storage area 190). Loop values for a process can be set and viewed by selecting a loop symbol 1503, and I/O metadata in data flow can be set and viewed by selecting a corresponding arrow 1504.

Figure 16:
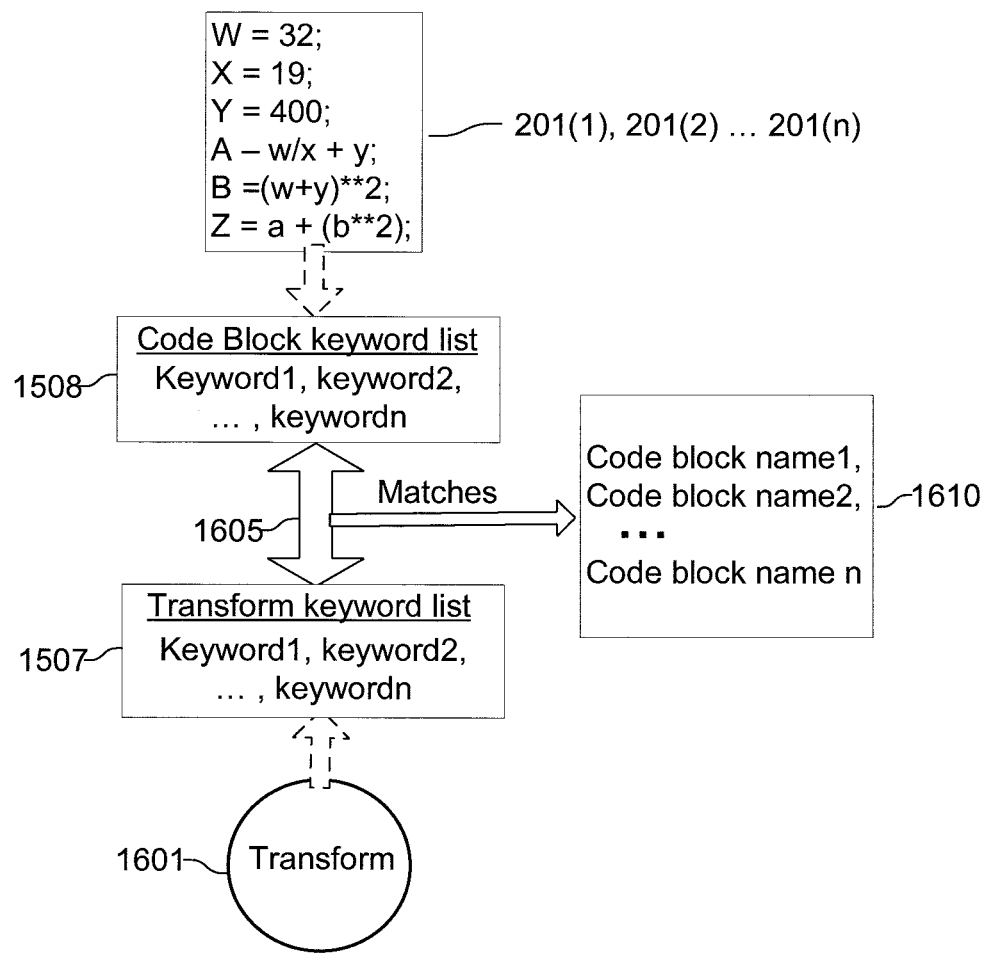
FIG. 16 is an exemplary diagram showing how a candidate list is generated.

With both the code block and the transformation process having associated keyword lists 1407 and 1507 respectively, a list of candidate code blocks may be created for any particular transformation process. FIG. 16 is an exemplary diagram showing how this candidate list 1610 is generated. As shown in FIG. 16, at step 1315 (FIG. 13), a keyword search is performed for keyword matches (indicated by arrow 1605) between a transformation process 1601 (via keyword list 1508) and candidate code blocks 201, to determine all possible matching code blocks [201(1), 201(2) . . . 201(n)], which are stored in a first list 1610.

Figure 17:
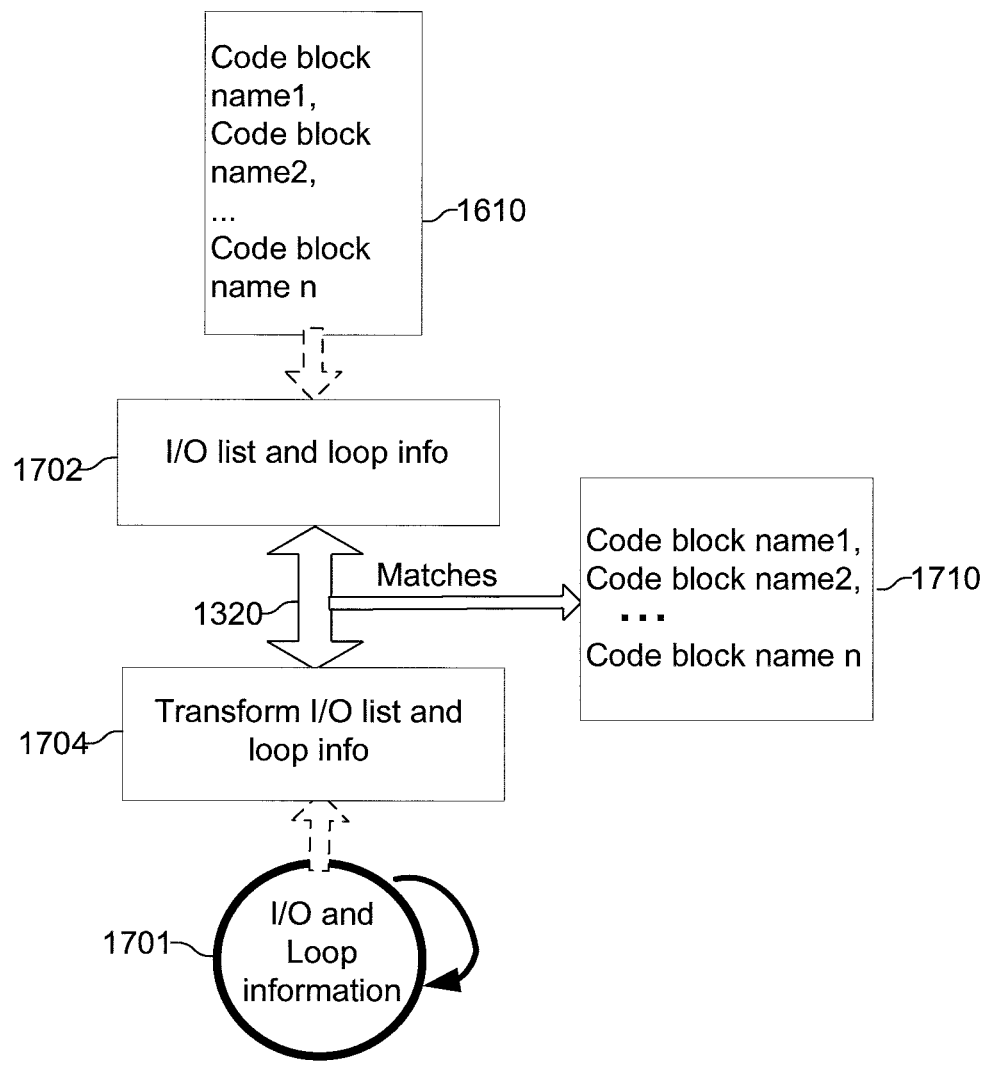
FIG. 17 is an exemplary diagram illustrating the present method of determining which code blocks have looping structures corresponding to a selected process.

List 1610 is normally too long, as only one code block name is normally required. FIG. 17 is an exemplary diagram illustrating the present method of determining which code blocks (in list 1610) have looping structures corresponding to a selected process. In order to shrink list 1610 (cull it) and also to determine if test procedures can be run against the various code blocks. Thus, at step 1320, I/O and loop information 1704 for the selected transformation process is compared with information 1702 relating to the I/O and loops of the various code blocks 201 in list 1610, as shown in FIG. 17, and those code blocks that do not match are removed, leaving a group of remaining code blocks in list 1710.

Figure 18:
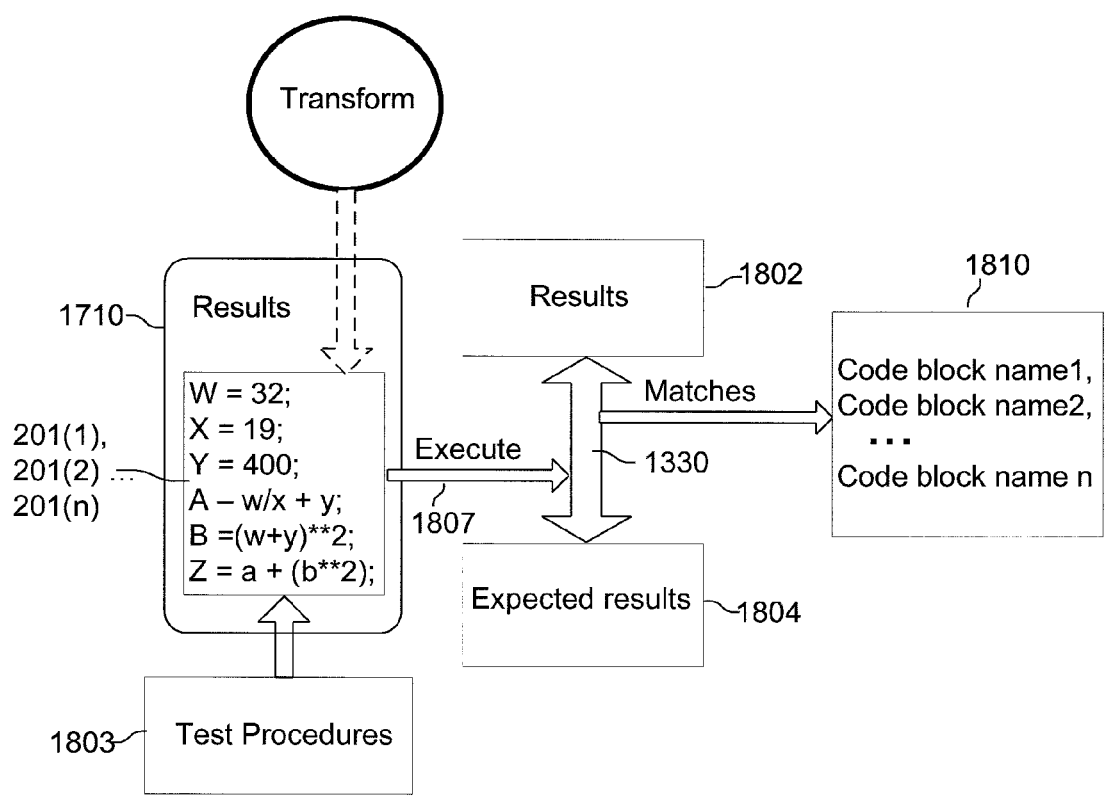
FIG. 18 is an exemplary diagram illustrating the present method of determining which code blocks (in list 1710) provide correct results executing specified test procedures.

Unlike traditional systems, the present method does not associate test procedures with code, but with transformation processes instead. Associating test procedures with design allows one test procedure to be run against all remaining code blocks. Since a test procedure consists of input and associated expected outputs, one can determine which code blocks generate the correct answers and which do not. FIG. 18 is an exemplary diagram illustrating the present method of determining which code blocks (in list 1710) provide correct results executing specified test procedures. As shown in FIG. 18, at step 1325 (FIG. 13), the remaining code blocks in list 1710 are executed (arrow 1807) using test procedure data 1803, and those code blocks that generate an incorrect answer are culled, at step 1330, leaving a group of remaining code blocks 1810. For example, using an interactive display program, a user may specify input and output variables and their expected (correct) results when applied to the selected code block. Comparing expected values 1804 to the received values (execution results) 1802 allows the system to cull those code blocks that do not produce the expected values.

After step 1330, there are typically only a few code blocks left. To further decrease the number of code blocks to a single one, an additional step may be performed, in which developer goals are evaluated. Here, the developer defines the overall goal to be achieved with the design. This goal is defined by a list of possible goals, examples of which are shown in Table 11 below.

TABLE 11

| Goal Name | Selection (yes/no) |
| --- | --- |
| Maximum Input Dataset Size | |
| Minimum System Resource Utilization | |
| Maximum Performance | |
| Maximum Amdahl Scaling | |
| Maximum Accuracy | |
| Minimum Price | |

A developer can mix and match goals to produce a desired result. At step 1335, the code block that best meets the selected goals is selected, via a comparison of developer goals, such as those shown in Table 12 below, with metadata for the remaining code blocks 1710.

TABLE 12

| Goal Name | Selection (yes/no) |
| --- | --- |
| Maximum Input Dataset Size | |
| Minimum System Resource Utilization | |
| Maximum Performance | |
| Maximum Amdahl Scaling | |
| Maximum Accuracy | |
| Minimum Price | |

The final selection criteria indicated by the developer are compared against candidate code blocks 1710 to yield the code block closest to the developer's goals. Automatically associating a code block with a design element means that code and design can no longer drift apart. Not being able to associate a design element with a code block means either the code must be re-written or the design must be further decomposed.

Data Store Extension

A data store is equivalent to a "C" or "C++" language data structure. What is still desired is a method for attaching FILES and DATABASES to processes. Attaching files and databases to processes is accomplished via a new data store type, the "F" (file) type. An example of an F-type object symbol is shown below:

F-Type Data Store Definition

A file definition list, such as that shown in Table 13, below, may be displayed in response to a user request.

TABLE 13

Flat File
Database

Flat File Selection

Figure 19:
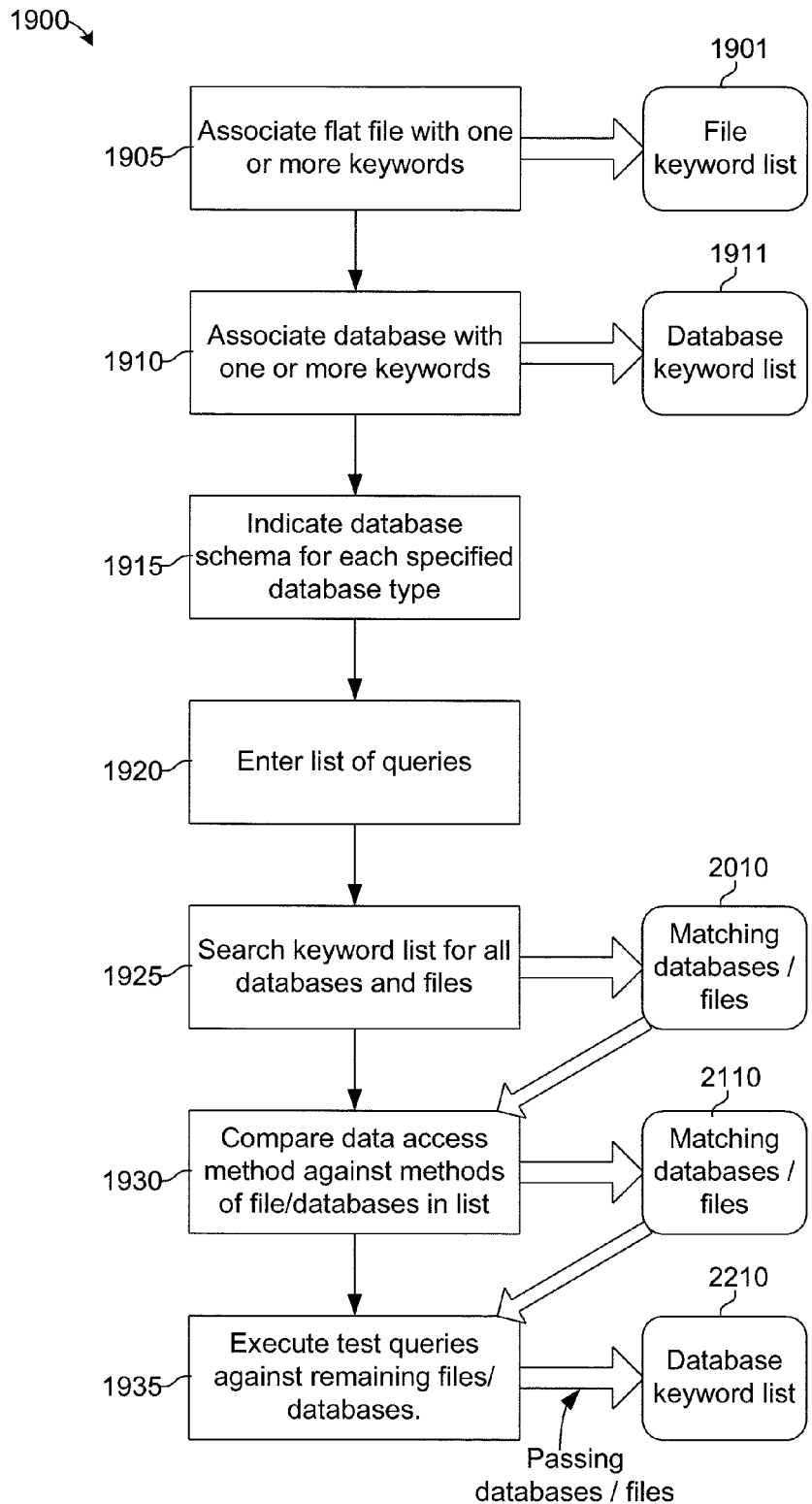
FIG. 19 is a flowchart 1900 showing an exemplary set of steps performed in automatically attaching files and databases to design elements.

FIG. 19 is a flowchart 1900 showing an exemplary set of steps performed in automatically attaching files and databases to design elements. As shown in FIG. 19, at step 1905, a developer associates a 'flat' file with one or more keywords. Selection of a 'flat file' or equivalent button allows the developer to define the file format association, as shown in Table 14 below

TABLE 14

| | | File Format | | | |
|---|---|---|---|---|---|
| | | File Name | | | |
| | | File Description | | | |
| | | Keyword List | | | |
| Field # | Field Name | Field Type | Field Description | # Dimensions | Dimension Size |
| | | | | | Dim 1 size |
| | | | | | Dim 2 size |
| | | | | | ... |
| | | | | | Dim n size |

Once the flat file has been defined, the present system can serialize any input dataset properly and save the data in a cloud or other environment. This data can then be used by any design by selecting the correct file name with the correct keyword list 1901 and field names/types. Standard file calls are treated as if they were database queries.

Database Selection

At step 1910, a developer associates a database file with one or more keywords. Selection of a 'database' or equivalent button causes the database information description to be displayed as shown in Table 15 below.

TABLE 15

Database Type
Database Name
Database Description
Keyword list
Schema
Queries

Select Database Type

Selecting the Database Type option causes a list of supported database types to be shown. An example of this list is shown in Table 16 below.

TABLE 16

| Database Name | Schema Flag |
|---|---|
| Sybase | Yes |
| IBM DB2 | Yes |
| Microsoft SQL Server | Yes |
| Oracle RDBMS | Yes |
| Informix | Yes |
| BaseX | No |
| Clusterpoint | No |
| eXist | No |
| OrientDB | No |
| MongoDB | No |
| SimpleDB | No |
| ... | |
| Any other supported databases | |

Schema

At step 1915, the developer enters the database schema for each selected database type, as shown in Table 17 below.

TABLE 17

| Schema Command # | Schema |
|---|---|
| 1 | Create ... |
| 2 | Update ... |
| 3 | Alter ... |
| 4 | Drop ... |
| 5 | Delete ... |
| 6 | Truncate ... |

The first time a table is defined it is placed into the selected database using, for example, the SQL CREATE TABLE command (for SQL databases) or similar command for noSQL databases. Adding data to an existing database table is performed using the SQL UPDATE (for SQL databases) or similar command for noSQL databases to +be generated. Changing the SQL schema is accomplished using an ALTER, DROP, DELETE, or TRUNCATE command for SQL databases.

Queries

At step 1920, selection of 'queries' allows the developer to enter a numbered list of queries to access the current database. A query can be accessed from the program by selecting the query number corresponding to the required query as a dataflow into the database, with the return value returning on the return data flow, as shown in Table 18 below.

TABLE 18

| Query # | Query |
|---|---|
| 1 | SELECT ... FROM ... WHERE ... ORDERBY ... |
| 2 | SELECT FROM WHERE ORDERBY |
| ... | |
| n | SELECT FROM WHERE ORDERBY |

The first time data is placed into the selected database will cause a SQL CREATE TABLE (for SQL databases) or similar command for noSQL databases. Adding data to an existing database will cause a SQL UPDATE (for SQL databases) or similar command for noSQL databases to be generated. Changing the Schema will cause an ALTER command to be generated for SQL databases.

A set of queries is attached to any database so that the database can be tested for correctness. An exemplary set of test queries is shown below in Table 19.

TABLE 19

| Test Query # | Test Query | Expected Query Return |
|---|---|---|
| 1 | SELECT...FROM...WHERE... ORDERBY... | |
| 2 | SELECT FROM WHERE ORDERBY | |
| ... | | |
| n | SELECT FROM WHERE ORDERBY | | n exemplary set of file 'queries' is shown in Table 20 below.

TABLE 20

| File Access # | File Query |
|---|---|
| 1 | Open |
| 2 | Close |
| 3 | Read |
| 4 | Write |
| 5 | Seek |
| 6 | Create |
| 7 | Unlink |

Automatic Attachment of Databases to Design Element

Since a file or a database can exist outside of a program it is very useful to be able to locate the proper file or database. Consider that the file format (for flat files) and schemas (for SQL databases) and keys (for key-value type noSQL databases) all define how to access the data. These data access methods can be used to find the correct file or database as well.

Figure 20:
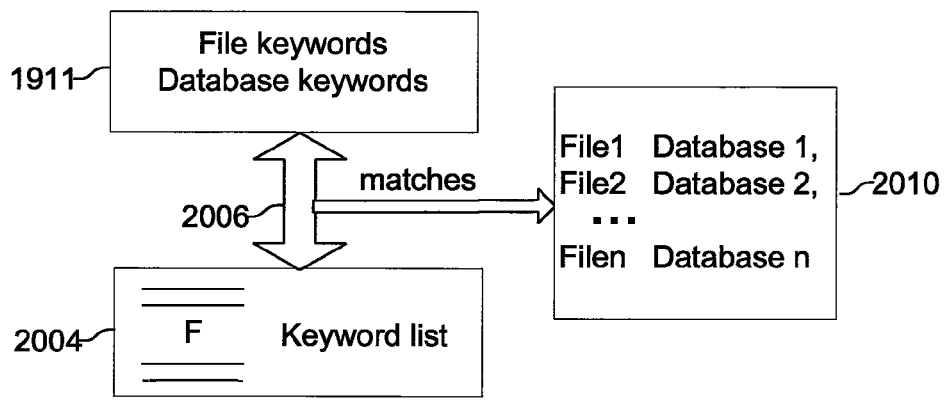
FIGS. 20, 21, and 22 are exemplary diagrams showing a process of automatically associating databases and design elements.
Figure 21:
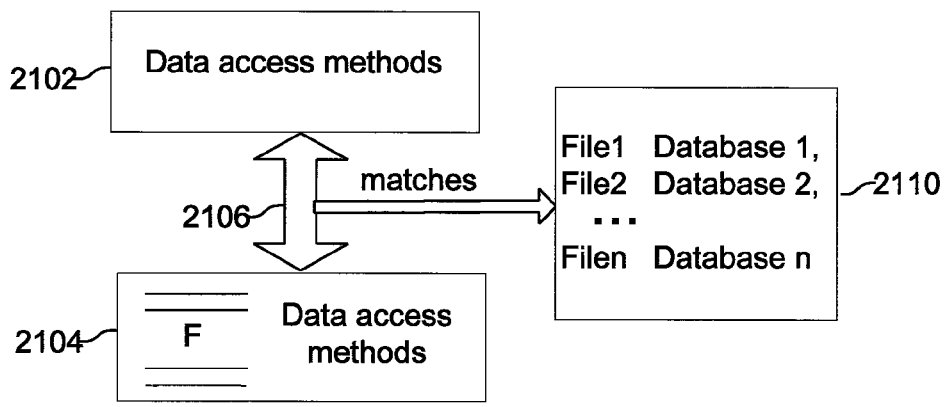
Figure 22:
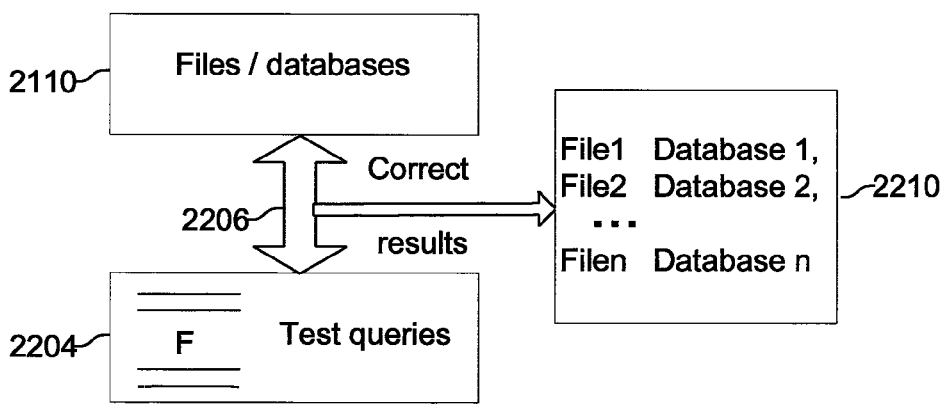

FIGS. 20 through 22 are exemplary diagrams showing the present method for automatically associating databases with design elements (control and process kernels or McCabe code blocks). It is initially determined whether the keyword search is against files or databases, and if against databases, whether the database is SQL or noSQl. As shown in FIG. 20, at step 1925 (FIG. 19), a search (indicated by arrow 2006) is then performed by comparing by the selected F-type data store keyword list 2004 against the database keyword list 1911 for all databases and files to create a list 2010 of potential file/databases.

As shown in FIG. 21, at step 1930 (FIG. 19), list 2010 is then culled by comparing the data access method 2104 defined by the F-type data store against the data access methods 2102 for the listed file/databases to create a list 2110 of matches, as indicated by arrow 2106.

List 2110 is further culled, as shown in FIG. 22, at step 1935 (FIG. 19), by executing queries 2204 defined by the F-type data store against the remaining files/databases 2110, as indicated by arrow 2206. If the query return values are incorrect, then those files/databases are culled, to generate list 2210. If there are more than one file/database, then the one that best meets the developer's overall goals is selected.

Having described the invention in detail and by reference to specific embodiments thereof, it will be apparent that modifications and variations are possible without departing from the scope of the invention defined in the appended claims. More specifically, it is contemplated that the present system is not limited to the specifically-disclosed aspects thereof.

What is claimed is:

1. A computer-implemented method for automatically extracting a design from source code comprising:
   identifying branching and looping commands in a code section;
   extracting process kernel code segments, connected by either branching or looping structures, from the code section;
   extracting control kernels from the code section;
   encapsulating the control kernels as state machines;
   encapsulating the process elements as process kernels; and
   associating meta-data with the control and process elements; and
   wherein the meta-data is used to associate the extracted process kernels and the extracted control kernels with code other than the original code used in the extracting steps.

2. The method of claim 1, wherein the extracted process kernels and the extracted control kernels are together treated as an algorithm.

* * * * *